United States Patent
Fox et al.

(10) Patent No.: US 10,370,083 B2
(45) Date of Patent: Aug. 6, 2019

(54) WING FOLD SYSTEM ROTATING LATCH

(71) Applicant: The Boeing Company, Chicago, IL (US)

(72) Inventors: Stephen John Fox, Everett, WA (US); Jan A. Kordel, Redmond, WA (US); Keith Townsend, Everett, WA (US); Matthew August Lassen, Seattle, WA (US); Mark John Gardner, Snohomish, WA (US); Mark Steven Good, Seattle, WA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 15/265,258

(22) Filed: Sep. 14, 2016

(65) Prior Publication Data
US 2017/0066521 A1 Mar. 9, 2017

Related U.S. Application Data

(62) Division of application No. 13/966,754, filed on Aug. 14, 2013, now Pat. No. 9,469,392.
(Continued)

(51) Int. Cl.
*B64C 3/56* (2006.01)
*B64C 23/06* (2006.01)

(52) U.S. Cl.
CPC ............. *B64C 3/56* (2013.01); *B64C 23/072* (2017.05); *Y02T 50/14* (2013.01); *Y02T 50/164* (2013.01); *Y02T 50/54* (2013.01)

(58) Field of Classification Search
CPC ........... B64C 3/56; B64C 23/065; B64C 5/12; B64C 5/08; Y10T 292/1039;
(Continued)

(56) References Cited

U.S. PATENT DOCUMENTS

| 1,718,617 A | 6/1929 | Wagner |
| 1,723,962 A | 8/1929 | Weymouth |

(Continued)

FOREIGN PATENT DOCUMENTS

| EP | 1375342 A1 | 1/2004 |
| EP | 0988225 B1 | 10/2006 |

(Continued)

OTHER PUBLICATIONS

Extended European Search Report, dated Sep. 18, 2018, regarding Application No. 18184756.7, 6 pages.
(Continued)

*Primary Examiner* — Marc Burgess
(74) *Attorney, Agent, or Firm* — Yee & Associates, P.C.

(57) ABSTRACT

An apparatus and method of a wing fold system may include a latch assembly rotating an unfixed portion of a wing, with respect to a fixed portion of the wing, between a flight position of the wing and a folded position of the wing. A first portion of the wing may hold a rotating portion of the latch assembly. A second portion of the wing may hold a secured portion of the latch assembly. The rotating portion of the latch assembly may rotate between an open position and a closed position. A slot in the rotating portion may receive the secured portion of the latch assembly. A securing portion of the rotating portion may secure a secured portion of the latch assembly. The latch assembly may prevent rotation of the second portion when the wing may be in the flight position.

17 Claims, 26 Drawing Sheets

Related U.S. Application Data

(60) Provisional application No. 61/720,328, filed on Oct. 30, 2012.

(58) Field of Classification Search
CPC .......... Y10T 292/104; Y10T 292/1041; Y10T 292/1044; Y10T 292/1045; Y10T 292/1047; Y10T 292/1048
USPC .......... 49/501–503; 292/240–242, 194, 200, 292/213, 215, 217; 269/228
See application file for complete search history.

(56) References Cited

U.S. PATENT DOCUMENTS

| | | | |
|---|---|---|---|
| 2,021,324 A | 11/1935 | Osborn | |
| 2,056,188 A | 10/1936 | Hayden | |
| 2,166,564 A | 7/1939 | Atwood et al. | |
| 2,280,809 A | 4/1942 | Evans | |
| 2,289,224 A | 7/1942 | Swanson et al. | |
| 2,290,850 A | 7/1942 | Umschweif | |
| 2,375,423 A | 5/1945 | Odilon | |
| 2,392,506 A | 1/1946 | Rosmann | |
| 2,444,332 A | 6/1948 | Briggs et al. | |
| 2,468,425 A | 4/1949 | Carpenter et al. | |
| 2,533,429 A | 12/1950 | Carpenter | |
| 2,674,422 A | 4/1954 | Pellarini | |
| 2,712,421 A | 7/1955 | Naumann | |
| 2,719,682 A | 10/1955 | Handel | |
| 2,876,677 A | 3/1959 | Clark et al. | |
| 3,081,053 A | 3/1963 | Jarrell | |
| 3,556,439 A | 1/1971 | Autry et al. | |
| 4,039,163 A * | 8/1977 | Shorey | B64C 1/22 244/137.1 |
| 4,249,765 A | 2/1981 | Janssen | |
| 4,336,914 A | 6/1982 | Thomson | |
| 4,457,479 A | 7/1984 | Daude | |
| 4,824,053 A | 4/1989 | Sarh | |
| 4,858,857 A | 8/1989 | Lange et al. | |
| 5,002,521 A | 3/1991 | Schwarz et al. | |
| 5,042,855 A * | 8/1991 | Bennett | E05B 65/0811 292/190 |
| 5,192,037 A | 3/1993 | Moorefield | |
| 5,201,479 A | 4/1993 | Renzelmann | |
| 5,310,138 A | 5/1994 | Fitzgibbon | |
| 5,350,135 A | 9/1994 | Renzelmann et al. | |
| 5,372,336 A | 12/1994 | Peaz | |
| 5,379,969 A | 1/1995 | Marx et al. | |
| 5,381,986 A | 1/1995 | Smith et al. | |
| 5,427,329 A | 6/1995 | Renzelmann et al. | |
| 5,452,643 A | 9/1995 | Smith et al. | |
| 5,492,288 A | 2/1996 | Bordelon | |
| 5,495,999 A | 3/1996 | Cymara | |
| 5,558,299 A | 9/1996 | Veile | |
| 5,593,113 A | 1/1997 | Cox | |
| 5,671,899 A | 9/1997 | Nicholas et al. | |
| 5,743,490 A | 4/1998 | Gillingham et al. | |
| 5,988,563 A | 11/1999 | Allen | |
| 6,032,418 A | 3/2000 | Larson | |
| 6,076,766 A | 6/2000 | Gruensfelder | |
| 6,089,502 A | 7/2000 | Herrick et al. | |
| 6,168,113 B1 | 1/2001 | Hann et al. | |
| 6,260,799 B1 | 7/2001 | Russ | |
| 6,273,369 B1 | 8/2001 | Nishimura | |
| 6,446,906 B1 | 9/2002 | Voigt et al. | |
| 6,834,835 B1 | 12/2004 | Knowles et al. | |
| 6,922,991 B2 | 8/2005 | Polcuch | |
| 7,275,722 B2 | 10/2007 | Irving et al. | |
| 7,445,180 B2 | 11/2008 | Plude et al. | |
| 7,637,454 B2 | 12/2009 | Pitt | |
| 7,744,038 B2 | 6/2010 | Sankrithi et al. | |
| 8,089,034 B2 | 1/2012 | Hammerquist | |
| 8,157,206 B2 | 4/2012 | Gionta et al. | |
| 8,336,830 B2 | 12/2012 | Eberhardt | |
| 8,342,447 B2 | 1/2013 | Etling | |
| 8,733,692 B2 | 5/2014 | Kordel et al. | |
| 9,211,946 B2 | 12/2015 | Good et al. | |
| 9,290,260 B2 | 3/2016 | Lassen et al. | |
| 9,296,469 B2 | 3/2016 | Santini et al. | |
| 2002/0066825 A1 | 6/2002 | Miralles et al. | |
| 2006/0284427 A1* | 12/2006 | Borycki | E02D 29/1427 292/240 |
| 2007/0057120 A1 | 3/2007 | McConnell | |
| 2009/0045288 A1 | 2/2009 | Nakamura et al. | |
| 2009/0302151 A1 | 12/2009 | Holmes | |
| 2010/0084516 A1 | 4/2010 | Eberhardt | |
| 2011/0001016 A1 | 1/2011 | Skillen et al. | |
| 2011/0180657 A1 | 7/2011 | Gionta et al. | |
| 2012/0032023 A1 | 2/2012 | Bousfield et al. | |
| 2012/0085858 A1 | 4/2012 | Seifert | |
| 2012/0228424 A1 | 9/2012 | Parker | |
| 2013/0099060 A1 | 4/2013 | Dees et al. | |
| 2013/0146716 A1 | 6/2013 | Gettinger | |
| 2013/0292508 A1 | 11/2013 | Fox | |
| 2013/0313356 A1 | 11/2013 | Santini et al. | |
| 2013/0327883 A1 | 12/2013 | Kordel et al. | |
| 2014/0014768 A1 | 1/2014 | Lassen et al. | |
| 2014/0061371 A1 | 3/2014 | Good et al. | |
| 2014/0117150 A1 | 5/2014 | Good et al. | |
| 2014/0117151 A1 | 5/2014 | Fox et al. | |
| 2015/0014478 A1 | 1/2015 | Lassen et al. | |
| 2015/0298793 A1 | 10/2015 | Fox et al. | |
| 2016/0083074 A1 | 3/2016 | Santini et al. | |

FOREIGN PATENT DOCUMENTS

| | | |
|---|---|---|
| EP | 2650212 A1 | 10/2013 |
| GB | 491050 A | 3/1938 |
| GB | 651436 A | 4/1951 |
| GB | 773739 A | 5/1957 |
| WO | 2011051699 A2 | 5/2011 |

OTHER PUBLICATIONS

Extended European Search Report, dated Jul. 21, 2015, regarding Application No. EP13190093.8, 6 pages.

Extended European Search Report, dated Jul. 24, 2015, regarding Application No. EP13189910.6, 6 pages.

Extended European Search Report, dated Jul. 24, 2015, regarding Application No. EP13190099.5, 5 pages.

Extended European Search Report, dated Jul. 27, 2015, regarding Application No. EP13189962.7, 7 pages.

Canadian Intellectual Property Office Examination Search Report, dated Aug. 3, 2015, regarding Application No. 2,825,073, 4 pages.

Canadian Intellectual Property Office Examination Search Report, dated Aug. 13, 2015, regarding Application No. 2,824,727, 4 pages.

"Folding wing," Wikipedia Foundation, Inc., dated Jun. 2, 2013, 5 pages. Accessed Jul. 29, 2013, http://en.wikipedia.org/wiki/Folding_wing.

Young et al., "Aircraft Excrescence Drag," North Atlantic Treaty Organization Advisory Group for Aerospace Research and Development AGARD-AG-264, Jul. 1981, 172 pages.

Office Action, dated Mar. 24, 2015, regarding USPTO Application No. 13/962,952, 24 pages.

Final Office Action, dated Aug. 21, 2015, regarding USPTO Application No. 13/962,952, 12 pages.

Office Action, dated Dec. 31, 2015, regarding U.S. Appl. No. 13/962,952, 30 pages.

Notice of Allowance, dated Apr. 7, 2016, regarding U.S. Appl. No. 13/962,952, 12 pages.

Office Action, dated Jul. 20, 2015, regarding U.S. Appl. No. 14/022,622, 23 pages.

Notice of Allowance, dated Nov. 12, 2015, regarding U.S. Appl. No. 14/022,622, 15 pages.

Notice of Allowance, dated Aug. 6, 2015, regarding U.S. Appl. No. 14/049,425, 20 pages.

Notice of Allowance, dated Jul. 24, 2015, regarding U.S. Appl. No. 13/964,072, 17 pages.

Office Action, dated Sep. 23, 2015, regarding U.S. Appl. No. 13/966,754, 16 pages.

(56) References Cited

OTHER PUBLICATIONS

Final Office Action, dated Feb. 10, 2016, regarding U.S. Appl. No. 13/966,754, 35 pages.
Office Action, dated Feb. 8, 2016, regarding U.S. Appl. No. 14/335,625, 38 pages.
Notice of Allowance, dated Jun. 8, 2016, regarding U.S. Appl. No. 13/966,754, 19 pages.
Notice of Allowance, dated Jul. 19, 2016, regarding U.S. Appl. No. 14/335,625, 20 pages.
Final Office Action, dated Oct. 12, 2018, regarding U.S. Appl. No. 15/057,123, 21 pages.
Canadian Intellectual Property Office Examination Search Report, dated Sep. 27, 2017, regarding Application No. 2,828,726, 4 pages.
European Patent Office Examination Search Report, dated Nov. 30, 2017, regarding Application No. 13189783.7, 10 pages.
European Patent Office Examination Report, dated Dec. 5, 2017, regarding Application No. 13189962.7, 3 pages.
Canadian Intellectual Property Office Examination Search Report, dated Nov. 30, 2016, regarding Application No. 2,828,726, 5 pages.
European Patent Office Examination Report, dated May 15, 2017, regarding Application No. EP13189962.7, 4 pages.
Notice of Allowance, dated Jan. 3, 2019, regarding USPTO U.S. Appl. No. 15/057,123, 7 pages.
Office Action, dated Mar. 13, 2019, regarding USPTO U.S. Appl. No. 15/248,641, 42 pages.

* cited by examiner

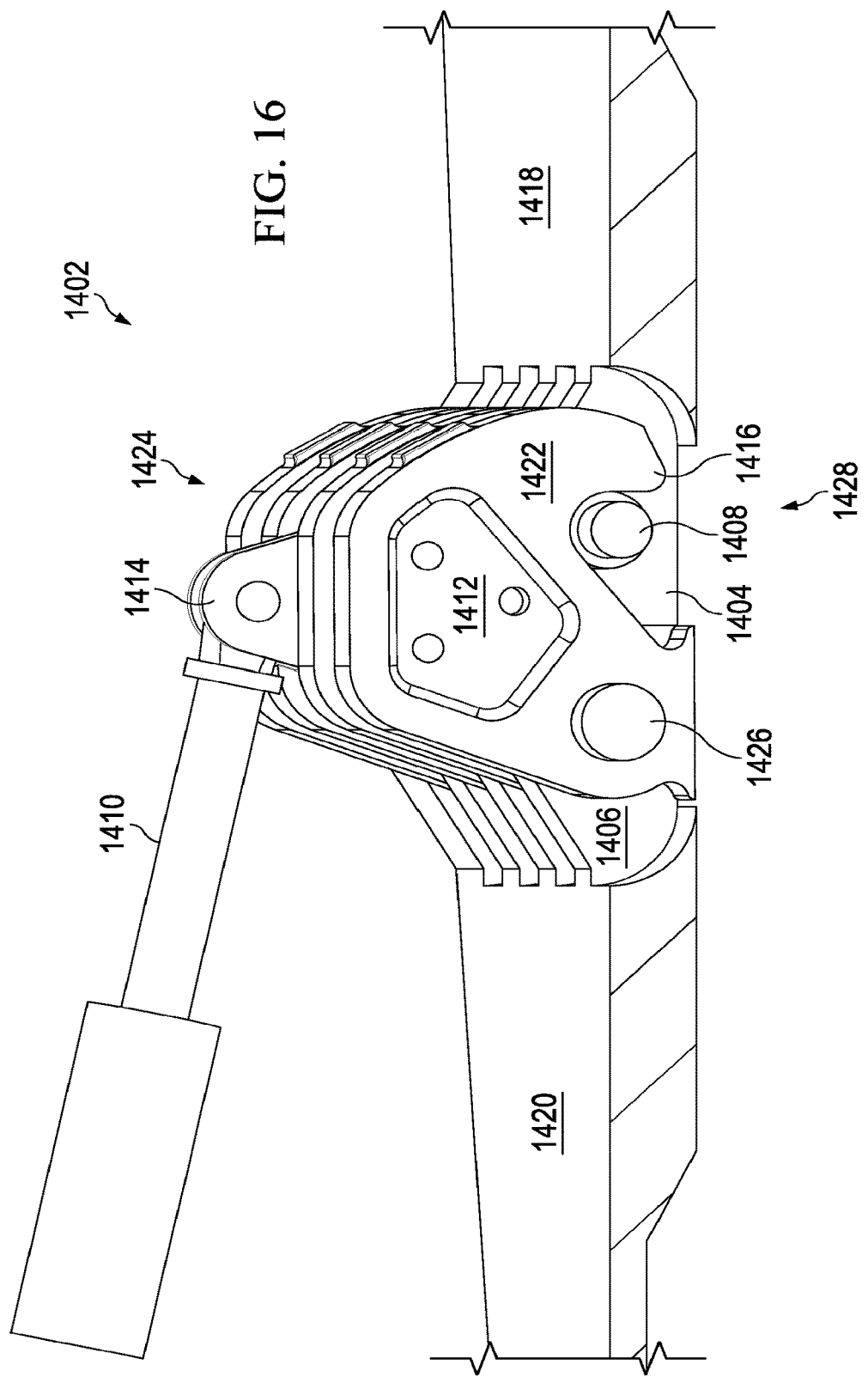

WING FOLD SYSTEM ROTATING LATCH

CROSS REFERENCE AND PRIORITY

This application is a divisional application of U.S patent application Ser. No. 13/966,754, filed Aug. 14, 2013, and issued as U.S Pat. No. 9,469,392 issued Nov. 18, 2016, which claims the benefit of Provisional U.S. Patent Application No. 61/720,328, filed Oct. 30, 2012, the entire disclosure of which is incorporated by reference herein.

FIELD OF THE DISCLOSURE

This disclosure relates to systems and methods for providing wings, and more specifically, to systems and methods for latching wings that enhance aircraft performance.

BACKGROUND OF THE DISCLOSURE

In today's commercial transport industry, it is highly desirable to design aircraft configurations that yield reduced fuel burn per seat-mile, as fuel burn per seat-mile is a metric of fuel efficiency. Efficient aircraft configurations are ever more important as fuel costs continue to increase. Aircraft aerodynamic drag and fuel burn are generally reduced as the aspect ratio of the aircraft wing increases. Similarly, operating larger aircraft which carry more passengers and payload is generally more efficient between two destinations than flying several trips with smaller aircraft. Thus larger aircraft and aircraft with longer wingspans tend to be more efficient. However, taxiway spacing and gate locations for most airports were established without providing adequate spacing for aircraft with longer wingspans that can be produced with today's technology.

Some attempts have been made to improve aircraft wing efficiency without adding wingspan. Winglets extending vertically from the wingtips have improved aircraft fuel efficiency without significantly increasing wingspan. However, the efficiency added by winglets is not as beneficial as that provided by extending the wingspan.

Some military aircraft have folding wings to reduce space needed to store the aircraft. Current wing folding designs contain features that add significant weight and/or drag to the wing of an aircraft.

Thus it is desired to provide an aircraft that can benefit from a long wingspan in flight, while being able to reduce the wingspan when operating at an airport, utilizing a system and method without weight and drag penalties of current folding wing aircraft.

SUMMARY

Some illustrative embodiments may provide for a method of latching a folding wing that may include a latch assembly of a wing fold system rotating an unfixed portion of a wing with respect to a fixed portion of the wing between a flight position of the wing and a folded position of the wing. A first portion of the wing may hold a rotating portion of the latch assembly. A second portion of the wing may hold a secured portion of the latch assembly. A slot of the rotating portion may receive the secured portion. The rotating portion of the latch assembly may rotate between an open position and a closed position. A securing portion of the rotating portion may secure a secured portion of the latch assembly when the rotating portion may be in the closed position. The latch assembly may prevent rotation of the second portion when the wing may be in the flight position.

Some illustrative embodiments may provide for an apparatus of a wing fold system that may include a fixed portion of a wing, an unfixed portion of the wing, a first portion of the wing, a second portion of the wing, and a latch assembly. The unfixed portion of the wing may rotate between a folded position of the wing and a flight position of the wing. The first portion of the wing may hold a rotating portion of a latch assembly of the wing. The second portion of the wing may hold a secured portion of the latch assembly of the wing. The latch assembly may prevent rotation of the unfixed portion of the wing. The rotating portion of the latch assembly may rotate between an open position and a closed position. The rotating portion may include a securing portion and a slot. The securing portion of the rotating portion secures the secured portion of the latch assembly when in the closed position. The slot of the rotating portion may receive the secured portion of the latch assembly when in the open position.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8A, is a diagram of the folding wing in a flight position with the latch assembly in a closed position in accordance with an illustrative embodiment; FIG. 8B is a diagram of the folding wing in a folded position, with the latch assembly in an open position in accordance with an illustrative embodiment;

FIG. 16 is a diagram of a perspective view from above looking aft inside a cutaway of a wing with a hook latch, zoomed in on one-half of FIG. 13, the wing in a flight position, and the hook latch in an closed position, in accordance with an illustrative embodiment;

FIG. 17A is a diagram of a side view of a hook latch for a folding wing in transition between an open position and a closed position, with a lock of the hook latch in a disengaged position, in accordance with an illustrative embodiment; and FIG. 17B is a diagram of a side view of a hook latch for a folding wing in the closed position, with a lock of the hook latch in an engaged position, in accordance with an illustrative embodiment;

FIG. 26 shows operation 2602 through operation 2620;

DETAILED DESCRIPTION

Figure 1:
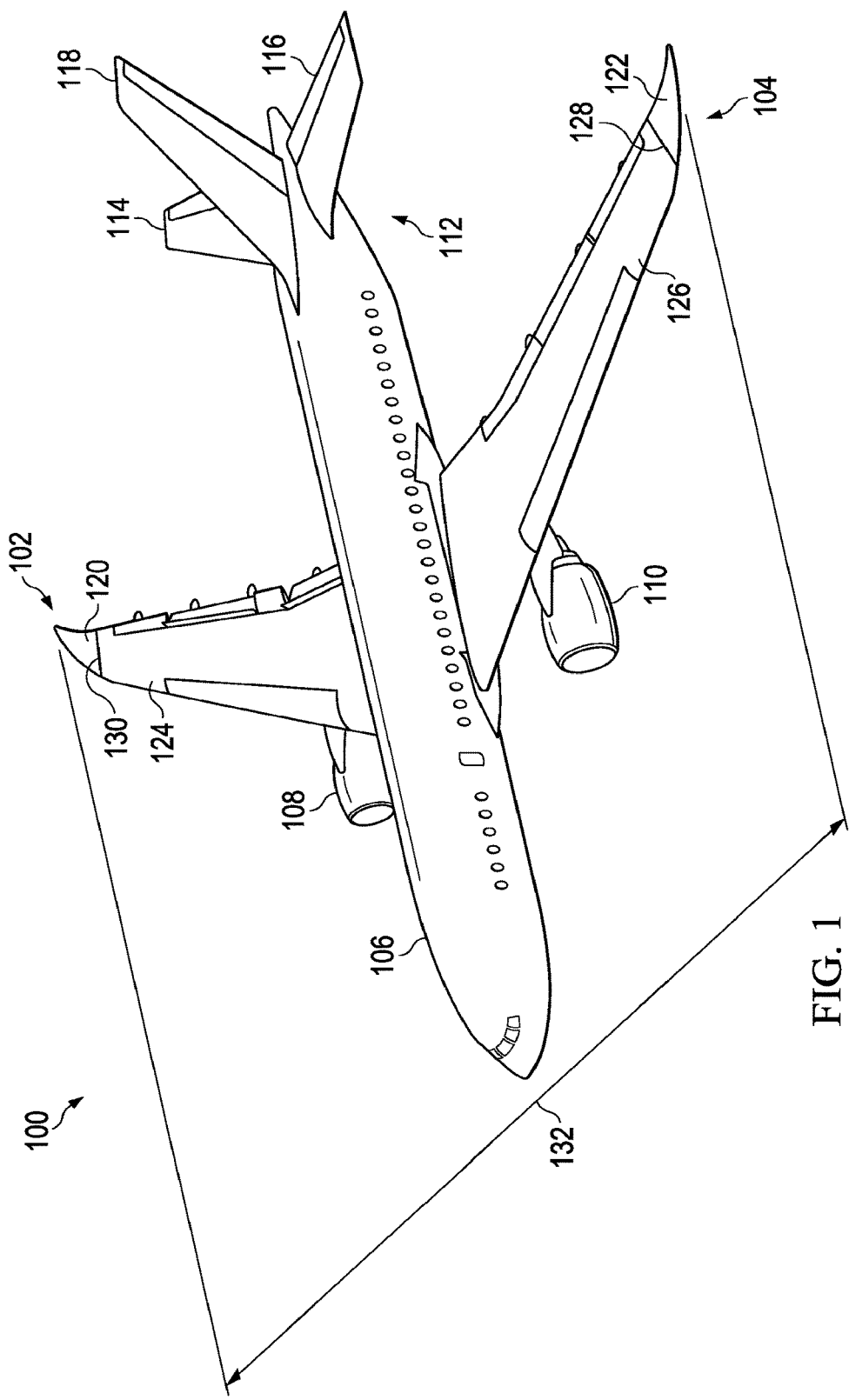
FIG. 1 is a diagram of an aircraft embodying a wing fold system in a flight position in accordance with an illustrative embodiment.

The illustrative embodiments described below may provide for a wing fold system within a wing and a method of folding a wing that may increase the fuel efficiency of an aircraft while precluding any increase in a shape and/or thickness of, and/or adding a fairing to, a wing shape that may not incorporate a wing fold system. The illustrative embodiments below may describe systems or methods that provide latching of a folding wingtip with less excrescence drag, lower manufacturing cost and better reliability than existing designs. Typical current folding wingtip latch pins and associated actuators may require large spatial integration volume. Typical current folding wingtip mechanisms often protrude outside the wing surface, and require a fairing, which adds drag.

By contrast the methods and systems illustrated below may be more compact than those used in current folding wings, and may eliminate a need for any wing fairing. The method and systems disclosed may preclude expansion of a wing shape when incorporating the wing fold system into the wing. Thus, a wing may gain an ability to fold, without changing a cross-sectional outline of the wing. Existing pin-in-lug designs generally require close tolerance and expensive dimensional control. Existing pin-in-lug designs require more maintenance than the systems and methods illustrated below. Existing pin-in-lug designs suffer failures to insert or retract.

Systems and methods illustrated below may allow looser dimensional tolerances, which afford reduced maintenance down time and costs. Systems and methods illustrated below may provide more latching surface area in contact, may better distribute torsional loads, may incorporate locking mechanisms and over center locking design features as well as locking mechanisms, may provide greater component reliability and redundancy, with less volume and weight than existing wing fold mechanisms. Further, components of the methods and systems illustrated below may be easier to access and replace than those of current wing fold designs.

Illustrative embodiments may recognize and take account of one or more different considerations. For example, having an aircraft that may benefit from a long wingspan in flight, while being able to reduce the wingspan when operating at an airport, such as but not limited to International Civil Aviation Organization "code E" airports, is desirable with respect to increasing the flexibility of where an aircraft may operate. In particular, by being able to reduce the wingspan while on the ground, an aircraft may be able to operate at more airports than if the aircraft could not reduce its wingspan while on the ground. With the longer wingspan during flight, benefits may include fuel efficiency.

Thus, control of the wingspan of an aircraft may be advantageously achieved through the use of a wing fold system. The wing fold system may transition an unfixed portion of a wing between a folded position and a flight position, therein controlling the wingspan of the aircraft.

The illustrative embodiments may allow for automated folding and extending of wingtips based on location of aircraft during preparation for takeoff or after landing. Architecture provided herein may include an wingtip folding system that may allow for increased aircraft reliability based in part on redundant system components. The system may be more adaptive to automated operation than current wing fold designs.

The illustrative embodiments may promote more ease in modification to wingtip folding functionality. Such functionality may include modification of software code as opposed to altering mechanical hardware and kinematic interfaces. Diagnostic capability of the wingtip system may include earlier detection of vulnerable components which may reduce time of exposure to latent vulnerabilities.

The system may be less subject to dynamic mechanical feedback. The illustrative embodiments may promote greater ease in verifying functionality of the system, allowing for checks of the system for possible latent problems via automated, periodic system tests. For example, the system may verify that a moveable wingtip is latched or locked to a fixed wingtip.

The illustrative embodiments may promote a reduced workload on crew. Minimal or no crew actions may be required to configure wingtips for flight or ground operations including taxiway and gate operations. Location-based alerting may also be promoted. Prior to takeoff, the system may verify that the aircraft is in flight worthy configuration before engine thrust may be applied. After landing, the system may verify that the aircraft is in a correct configuration for taxiway, runway, gate and maintenance facility operations.

The illustrative embodiments may provide improvements over previous wing control arrangements that may require large spatial integration volume. Such previous requirements may result in increased wing thickness that may cause excess drag and greater weight. Previous designs also may not be readily modified or optimized once their designs are finalized as may be possible with embodiments illustrated below.

By contrast, the illustrative embodiments may provide a more electrical and optical control system as compared to previous hydraulic and mechanical heavy designs. Improved folding designs may allow for less required force to move the unfixed portion of the wing, and enable use of less powerful actuators. Less powerful actuators may be smaller and/or lighter than current actuators. Less powerful actuators may be electric in place of previously used hydraulic actuators. The illustrative embodiments may reduce component volume and allow for optimization and modification via software updates. Further, the illustrative embodiments may alleviate concerns over lightning strikes and electromagnetic effects when considering optical signal transmission. A more electric architecture may allow for easier build and maintainability of aircraft through installation of replaceable components as opposed to mechanical components that may require individual shimming and rigging.

Figure 2:
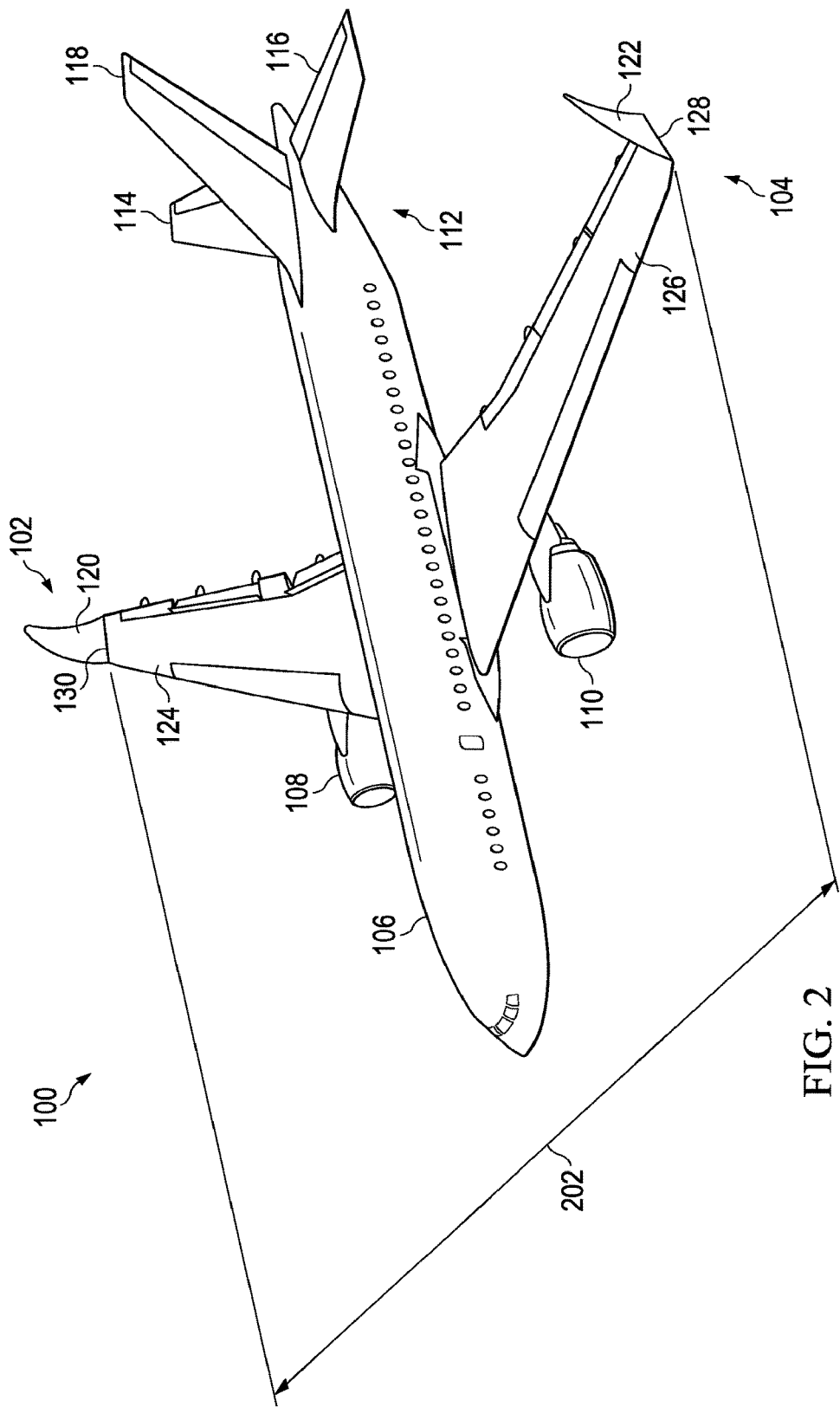
FIG. 2 is a diagram of an aircraft embodying a wing fold system in a folded position in accordance with an illustrative embodiment.
Figure 3:
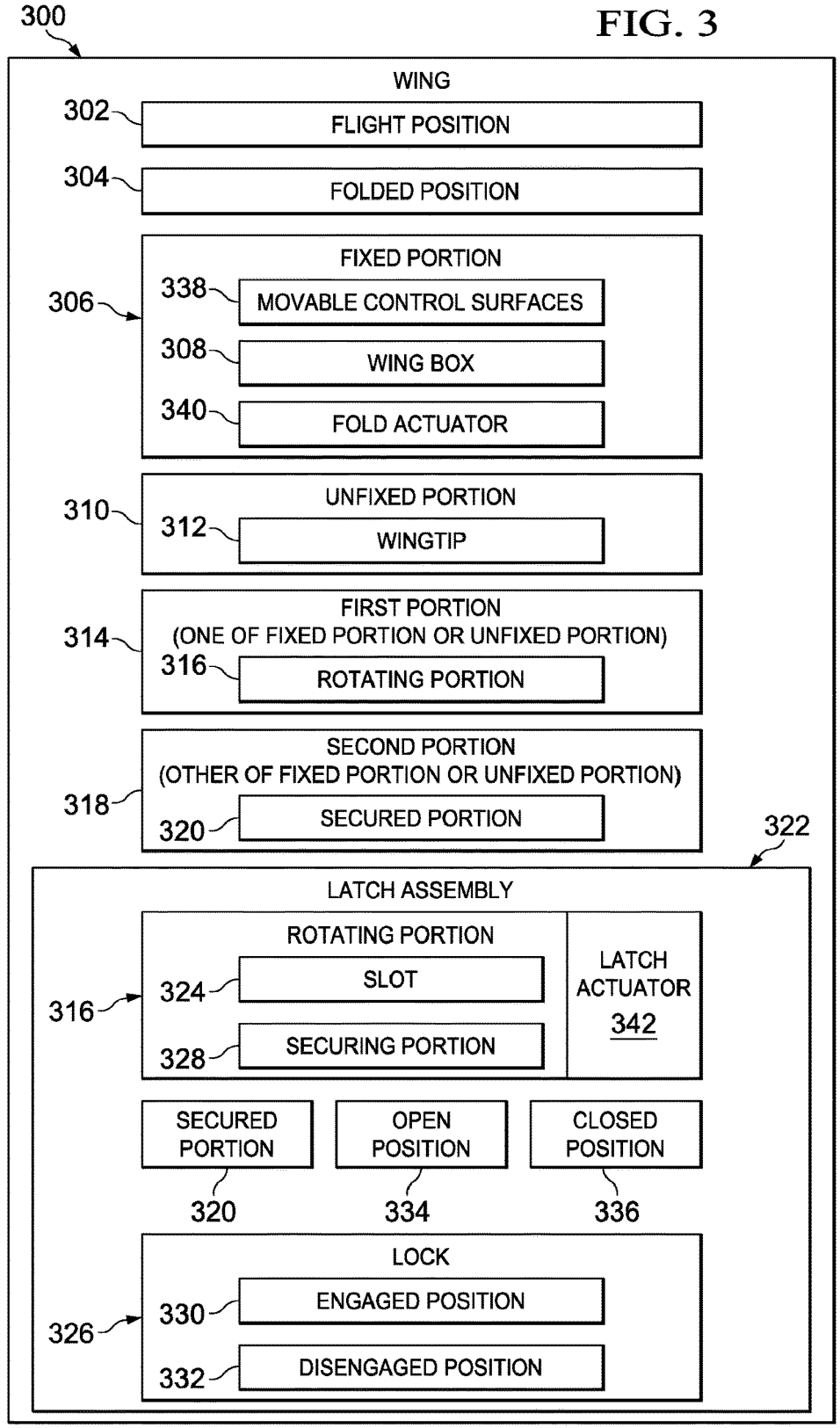
FIG. 3 is a block diagram of a wing with a rotating latch in accordance with an illustrative embodiment.

Unless otherwise noted and where appropriate, similarly named features and elements of illustrative embodiments of one figure of the disclosure correspond to and embody similarly named features and elements of embodiments of the other figures of the disclosure. With reference now to the figures, and in particular, with reference to FIGS. 1 and 2, FIGS. 1 and 2 are diagrams of an aircraft depicted in accordance with illustrative embodiments. Aircraft 100 may be an example of an aircraft in which a wing fold system may be implemented in accordance with an illustrative embodiment. In this illustrative example, aircraft 100 may include wing 102 and wing 104 attached to body 106; engine 108 attached to wing 102; and engine 110 attached to wing 104. FIG. 1 depicts wings 102 and 104 of aircraft 100 in flight position 302 of FIG. 3 and FIG. 2 depicts wings 102 and 104 of aircraft 100 in folded position 304 of FIG. 3.

Wing 102 may include a fixed portion 124 and an unfixed portion 120. Fixed portion 124 may be an inboard portion of the wing fixed to body 106. Similarly, wing 104 may include a fixed portion 126 and an unfixed portion 122. Wing 102 may include wing fold system 130 that may move unfixed portion 120 with respect to fixed portion 124. Wing 104 may include wing fold system 128 that may move unfixed portion 122 with respect to fixed portion 126. FIG. 1 shows wing fold system 128 and 130 of aircraft 100 in flight position 302, with wingspan 132 such that aircraft 100 may be ready for flight. FIG. 2 shows wingspan 202, reduced from wingspan 132, for operation at an airport.

Body 106 may connect to tail section 112. Horizontal stabilizer 114, horizontal stabilizer 116, and vertical stabilizer 118 may be attached to tail section 112 of body 106.

Aircraft 100 may be an example of an aircraft in which a wing fold system may be implemented in accordance with an illustrative embodiment. Wing fold system 128 and wing fold system 130 each may include a latch assembly in accordance with an illustrative embodiment.

With reference to FIG. 3, FIG. 3 is a block diagram of a wing with a rotating latch in accordance with an illustrative embodiment. Wing 300 may be an illustrative embodiment of wing 102 and/or wing 104 in FIG. 1. Wing 300 may include flight position 302, folded position 304, fixed portion 306, unfixed portion 310, first portion 314, second portion 318, and latch assembly 322. A folding capability of wing 300 may allow for aircraft 100 to be flown with wingspan 132, as shown in FIG. 1, that may be longer than wingspan 202, as shown in FIG. 2, that may be allowed for ground operation at an airport. Wing 300 may provide lift for aircraft 100 in FIG. 1.

Flight position 302 may be a state of wing 300. When an aircraft's wings may be in flight position 302, the aircraft may be ready for flight. Wing 102 and wing 104 of FIG. 1 are in a flight position, such as flight position 302 of FIG. 3. A latch may close to secure wing 300 in flight position 302 and a lock may engage the latch to ensure wing 300 stays in flight position 302.

Folded position 304 may be a state of wing 300. When wings of aircraft 100 may be in folded position 304, aircraft 100 is not ready for flight, but the overall wingspan of aircraft 100 may be sufficiently small to allow use of aircraft 100 at airports that require smaller overall wingspan.

Fixed portion 306 may be an embodiment of fixed portion 124 of wing 102 and an example of an embodiment of fixed portion 126 of wing 104 in FIG. 1. Fixed portion 306 of wing 300 may include wing box 308, moveable control surfaces 338, and fold actuator 340. Wing box 308 is a structural component that may be comprised by wing 300. Moveable control surfaces 338 may include flaps that allow for controlling flight of aircraft 100.

Unfixed portion 310 may be an example of an embodiment of unfixed portion 120 of wing 102 and an embodiment of unfixed portion 122 of wing 104 in FIG. 1. Unfixed portion 310 may rotate with respect to fixed portion 306 of wing 300 between flight position 302 of wing 300 and folded position 304 of wing 300. Unfixed portion 310 of wing 300 may include wingtip 312. Wingtip 312 may not include moveable control surfaces 338.

First portion 314 of wing 300 may be one of fixed portion 306 and unfixed portion 310. Second portion 318 of wing 300 may be the other of fixed portion 306 and unfixed portion 310. First portion 314 may include rotating portion 316 of latch assembly 322. First portion 314 may connect rotating portion 316 of latch assembly 322 to wing 300. Second portion 318 may include secured portion 320 of latch assembly 322 to wing 300. Second portion 318 may connect secured portion 320 of latch assembly 322 to wing 300.

Latch assembly 322 may include open position 334, closed position 336, rotating portion 316, secured portion 320, lock 326, and latch actuator 342. Latch assembly 322 may prevent rotation of unfixed portion 310. Rotation of unfixed portion 310 may be prevented when wing 300 is in flight position 302. Latch assembly 322 may allow rotation of unfixed portion 310. Unfixed portion 310 may be rotated to folded position 304 for operations when aircraft 100 is not in flight.

Open position 334 may allow unfixed portion 310 of wing 300 to transition to flight position 302. Closed position 336 may prevent unfixed portion 310 from moving with respect to fixed portion 306. Second portion 318 may be latched in secured portion 320 when latch assembly 322 is in closed position 336. When latch assembly 322 is in closed position 336, lock 326 may transition between engaged position 330 and disengaged position 332.

Rotating portion 316 may include slot 324 and securing portion 328. Rotating portion 316 of latch assembly 322 may rotate between open position 334 and closed position 336. Latch actuator 342 may move rotating portion 316. Securing portion 328 may secure secured portion 320 of latch assembly 322 when rotating portion 316 is in closed position 336. Slot 324 may receive secured portion 320 when rotating portion 316 is in open position 334 or when rotating portion 316 may transition between open position 334 and closed position 336.

Secured portion 320 may be attached to second portion 318. Secured portion 320 may be received by slot 324 of rotating portion 316 when rotating portion 316 is in open position 334 or when rotating portion 316 transitions between open position 334 and closed position 336. Secured portion 320 may be secured by securing portion 328 of rotating portion 316 when rotating portion 316 is in closed position 336.

Lock 326 may include engaged position 330 and may include disengaged position 332. Lock 326 may engage rotating portion 316 of latch assembly 322 when rotating portion 316 is in closed position 336. Lock 326 may prevent rotation of rotating portion 316 of latch assembly 322 when lock 326 is engaged with rotating portion 316.

Engaged position 330 of lock 326 may prevent rotating portion 316 from moving when rotating portion 316 is in closed position 336. Disengaged position 332 of lock 326 may allow rotating portion 316 to transition between open position 334 and closed position 336.

Figure 4:
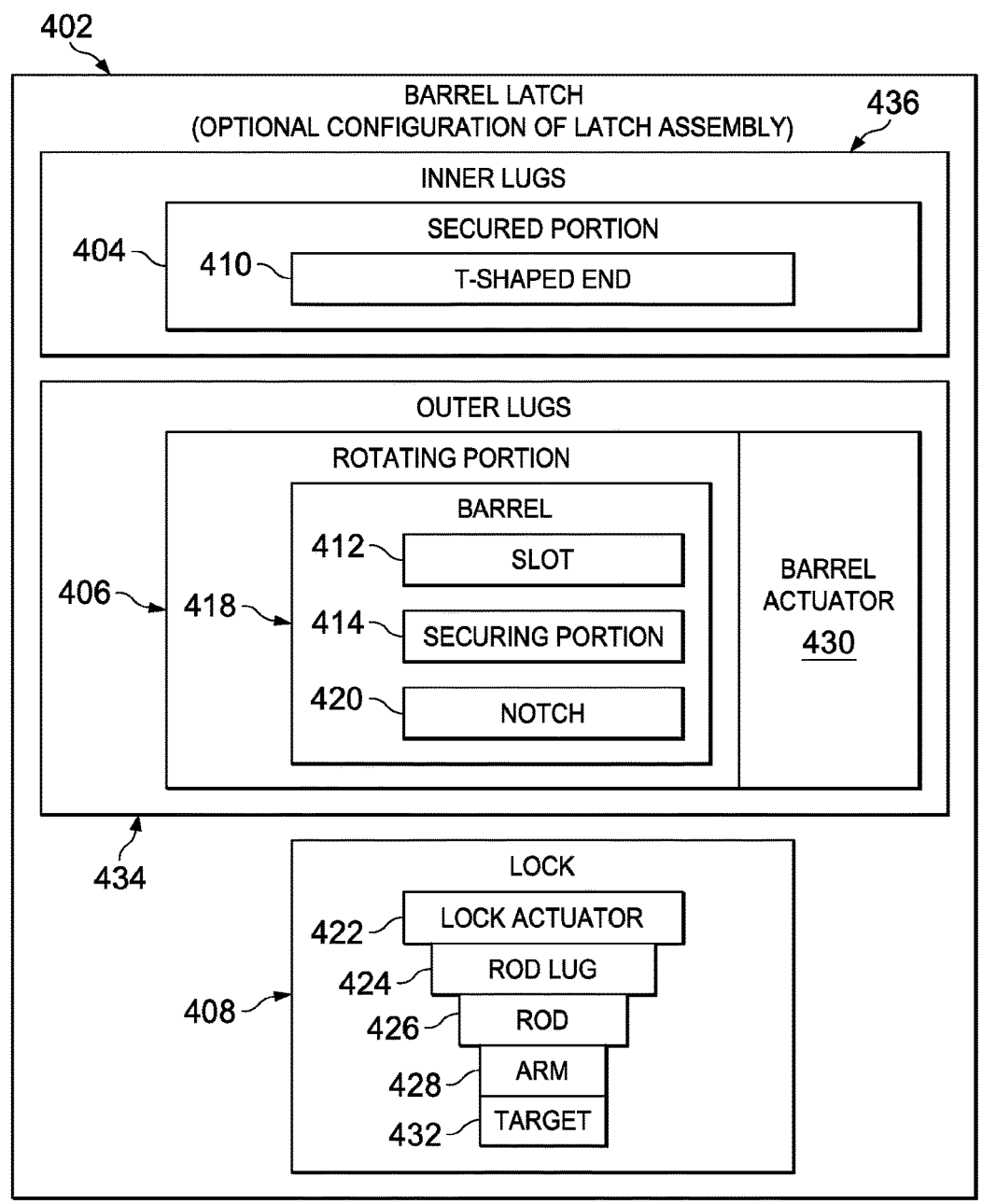
FIG. 4 is a block diagram of a latch assembly configured as a barrel latch in accordance with an illustrative embodiment.

With reference to FIG. 4, FIG. 4 is a block diagram of a latch assembly configured as a barrel latch in accordance with an illustrative embodiment. Barrel latch 402 is an embodiment of latch assembly 322 of FIG. 3. Barrel latch 402 may prevent rotation of an unfixed portion, such as unfixed portion 120, unfixed portion 122, and unfixed portion 310 of FIGS. 1, 2, and 3; of a wing, such as wing 102, wing 104, and wing 300 of FIGS. 1, 2, and 3.

Barrel latch 402 may include secured portion 404, rotating portion 406, and lock 408. Secured portion 404 may be an example of an embodiment of secured portion 320 of FIG. 3.

Secured portion 404 may include T-shaped end 410. Secured portion 404 may be connected to a set of inner lugs 436 attached to second portion 318 of wing 300 of FIG. 3. T-shaped end 410 may be received by slot 412 of rotating portion 406, when rotating portion 406 may be in open position 334. T-shaped end 410 of secured portion 404 may be secured by securing portion 414 of rotating portion 406 when rotating portion 406 may be in closed position 336.

Rotating portion 406 may be an example of an embodiment of rotating portion 316 of FIG. 3. Rotating portion 406 may be connected to a set of outer lugs 434 attached to first portion 314 of wing 300 of FIG. 3. Rotating portion 406 may rotate between open position 334 and closed position 336. Rotating portion 406 may include barrel 418.

Barrel 418 may include slot 412, securing portion 414, and notch 420. Barrel 418 may be cylindrically shaped. Barrel 418 may be rotated by barrel actuator 430. Barrel actuator 430 may be an example of an embodiment of latch actuator 342 of FIG. 3. Slot 412 of barrel 418 may receive T-shaped end 410 of secured portion 404 when rotating portion 406 may be in open position 334. Securing portion 414 of barrel 418 may secure secured portion 404 of barrel latch 402 when rotating portion 406 may be in closed position 336. Notch 420 of barrel cylindrically shaped barrel 418 may engage lock 408.

Lock 408 may include: lock actuator 422, rod lug 424, rod 426, and arm 428. Lock actuator 422 may be connected to rod lug 424, which may be connected to rod 426, which may be connected to arm 428.

Extension of lock actuator 422 may rotate rod lug 424 upward away from barrel 418. Rod lug 424 rotating away from barrel 418 may rotate rod 426 in the same direction as rod lug 424. Rotating rod 426 in the same direction as rod lug rod lug 424 may move arm 428 upward away from any contact with barrel 418.

Arm 428 may also be moved into contact with notch 420 when lock actuator 422 retracts. When lock actuator 422 retracts, rod lug 424 may be pulled down toward barrel 418, and rod 426 may rotate in the same direction as rod lug 424. Rod 426 rotating in the same direction as rod lug rod lug 424 may move arm 428 downward and arm 428 may contact barrel 418.

When barrel 418 may be in closed position 336, notch 420 may be in position that may receive arm 428. Notch 420 may be an open section in an end portion of barrel 418. Arm 428 may engage with barrel 418 in a manner that may prevent rotation of barrel 418.

Arm 428 may include target 432. Target 432 may extend from arm 428. A sensor may detect target 432 when arm 428 may be engaged in notch 420.

If arm 428 is moved to contact barrel 418 while barrel 418 is in open position 334, then arm 428 may not engage notch 420. If arm 428 does not engage notch 420, then arm 428 may not restrict rotation of barrel 418.

Rod 426 may connect to more than one arm 428. More than one arm 428 connected to rod lug 424 may provide redundancy for locking barrel 418 against rotation from closed position 336 to open position 334.

Figure 5:
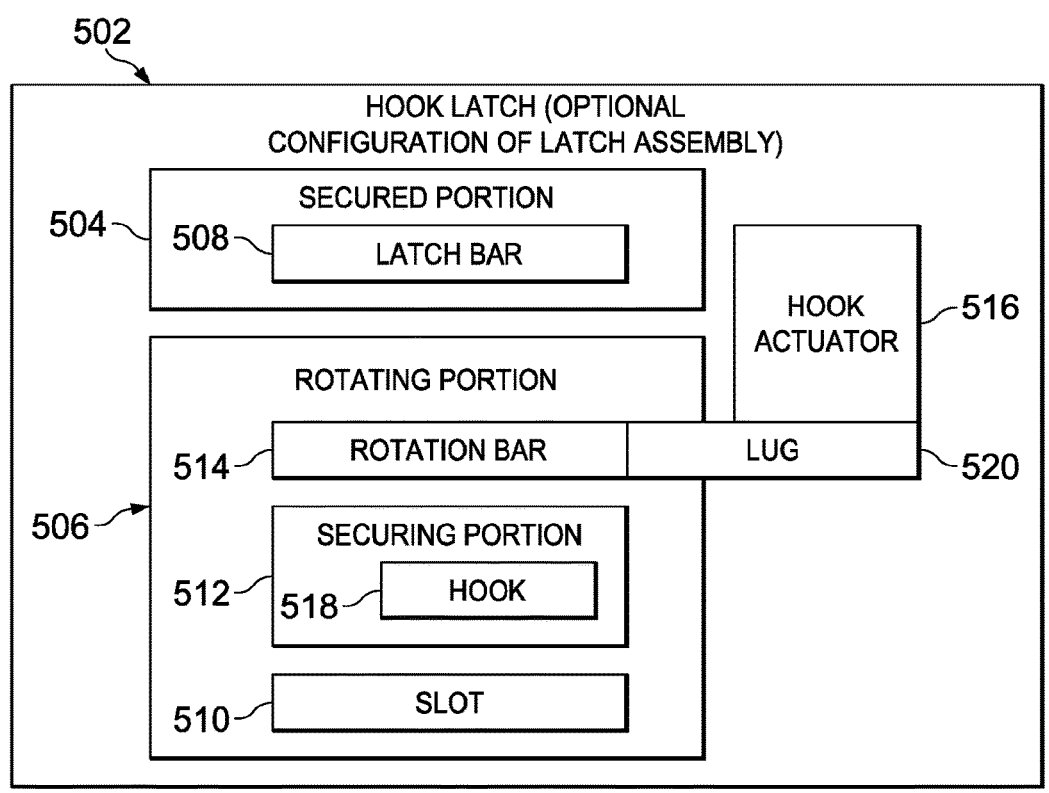
FIG. 5 is a block diagram of a latch assembly configured as a hook latch in accordance with an illustrative embodiment.

With reference to FIG. 5, FIG. 5 is a block diagram of a latch assembly configured as a hook latch in accordance with an illustrative embodiment. Hook latch 502 may be an example of an embodiment of latch assembly 322 of FIG. 3. More specifically, hook latch 502 may prevent rotation of an unfixed portion, such as unfixed portion 120, unfixed portion 122, and unfixed portion 310 of FIGS. 1, 2, and 3; of a wing, such as wing 102, wing 104, and wing 300 of FIGS. 1, 2, and 3; and of an aircraft, such as aircraft 100 of FIGS. 1 and 2. Hook latch 502 may include secured portion 504, rotating portion 506, and hook actuator 516.

Secured portion 504 may be an embodiment of secured portion 320 of FIG. 3. Secured portion 504 may be attached to a second portion of a wing of an aircraft, such as second portion 318 of wing 300 of FIG. 3. Secured portion 504 may include latch bar 508 that may be received by slot 510 of rotating portion 506 when rotating portion 506 transitions between open position 334 and closed position 336. Latch bar 508 of secured portion 504 may be secured by securing portion 512 of rotating portion 506 when rotating portion 506 is in closed position 336.

Rotating portion 506 may be an example of an embodiment of rotating portion 316 of FIG. 3. Rotating portion 506 may include slot 510, securing portion 512, and rotation bar 514. Rotating portion 506 may rotate between open position 334 and closed position 336.

Rotation bar 514 may include lug 520. Lug 520 may be moved by hook actuator 516. Lug 520 moving may rotate rotation bar 514 and engage hook 518 of securing portion 512 with latch bar 508 of secured portion 504. Rotation bar 514 may be connected to one or more securing portion 512, and to one or more hook 518. Each rotating portion 506 may have one or more hook 518. Rotation bar 514 may be used to rotate a group of at least one hook 518 in embodiments that may use multiple hooks.

Securing portion 512 may be an example of an embodiment of securing portion 328 of FIG. 3. Securing portion 512 may include hook 518. Securing portion 512 may secure latch bar 508 of secured portion 504 of hook latch 502 when rotating portion 506 is in closed position 336.

Slot 510 of rotating portion 506 may receive secured portion 504 when rotating portion 506 transitions between open position 334 and closed position 336. Hook 518 may engage latch bar 508 of secured portion 504 to prevent rotation of unfixed portion 310 of wing 300.

Using more than one rotating portion 506, with each rotating portion having its own securing portion 512, and each securing portion having its own hook 518 may provide redundancy in securing the rotating portion 506 to the secured portion 504 in the event that one or more of the rotating portion 506 are unable to engage the secured portion sufficiently to keep hook latch 502 in closed position 336.

Figure 6:
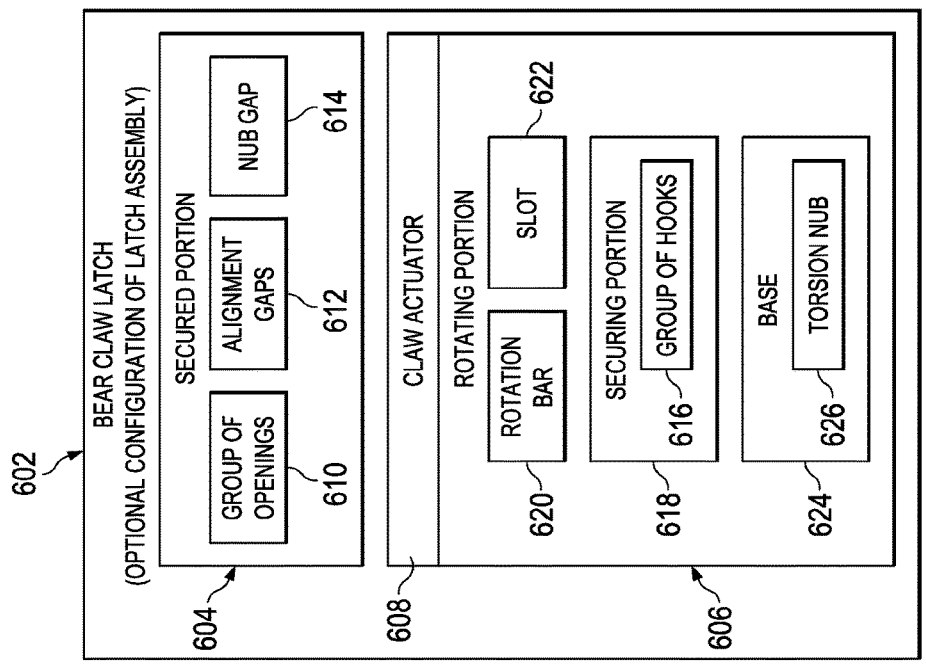
FIG. 6 is a block diagram of a latch assembly configured as a bear claw latch in accordance with an illustrative embodiment.

With reference to FIG. 6, FIG. 6 is a block diagram of a latch assembly configured as a bear claw latch in accordance with an illustrative embodiment. Bear claw latch 602 is an embodiment of latch assembly 322 of FIG. 3. Bear claw latch 602 may prevent rotation of an unfixed portion, such as unfixed portion 120, unfixed portion 122, and unfixed portion 310 of FIGS. 1, 2, and 3; of a wing, such as wing 102, wing 104, and wing 300 of FIGS. 1, 2, and 3; and of an aircraft, such as aircraft 100 of FIGS. 1 and 2. Bear claw latch 602 may include secured portion 604, rotating portion 606, and claw actuator 608.

Secured portion 604 may be an embodiment of secured portion 320 of FIG. 3. Secured portion 604 may be attached to a second portion, such as second portion 318 of wing 300 of FIG. 3. Secured portion 604 may include group of openings 610, alignment gaps 612, and nub gap 614.

Group of openings 610 may receive group of hooks 616 of securing portion 618 of rotating portion 606 when rotating portion 606 transitions between open position 334 and closed position 336. Secured portion 604 may be secured by group of hooks 616 of securing portion 618 of rotating portion 606 when rotating portion 606 is in closed position 336.

Rotating portion 606 may be an example of an embodiment of rotating portion 316 of FIG. 3. Rotating portion 606 may include, securing portion 618, rotation bar 620, slot 622, and base 624. Rotating portion 606 may rotate between open position 334 and closed position 336.

Base 624 may include torsion nub 626. Torsion nub 626 may engage nub gap 614 of secured portion 604 when bear claw latch 602 is in closed position 336.

Rotating portion 606 may be rotated by claw actuator 608. Claw actuator 608 may move rotating portion 606, may rotate group of hooks 616. Moving rotating portion 606 may engage group of hooks 616 of securing portion 618 with group of openings 610 of secured portion 604. Group of hooks 616 may be formed as a single unit. Rotation bar 620 may allow securing portion 618 to rotate about base 624.

Securing portion 618 may be an example of an embodiment of securing portion 328 of FIG. 3. Securing portion 618 may secure secured portion 604 to rotating portion 606. Rotating portion 606 may be in closed position 336 when securing portion 618 may secure secured portion 604 to rotating portion 606. Slot 622 of rotating portion 606 may receive secured portion 604. Rotating portion 606 may enter slot 622 when rotating portion 606 transitions from open position 334 to closed position 336.

Securing portion 618 may include group of hooks 616. Group of hooks 616 may engage group of openings 610 of secured portion 604. Group of hooks 616 engaging group of openings 610 of secured portion 604 may prevent rotation of unfixed portion 310 of wing 300. Rotation of unfixed portion 310 of wing 300 may be undesirable when wing 300 may be in flight position 302, such as when an aircraft is in flight.

Figure 7:
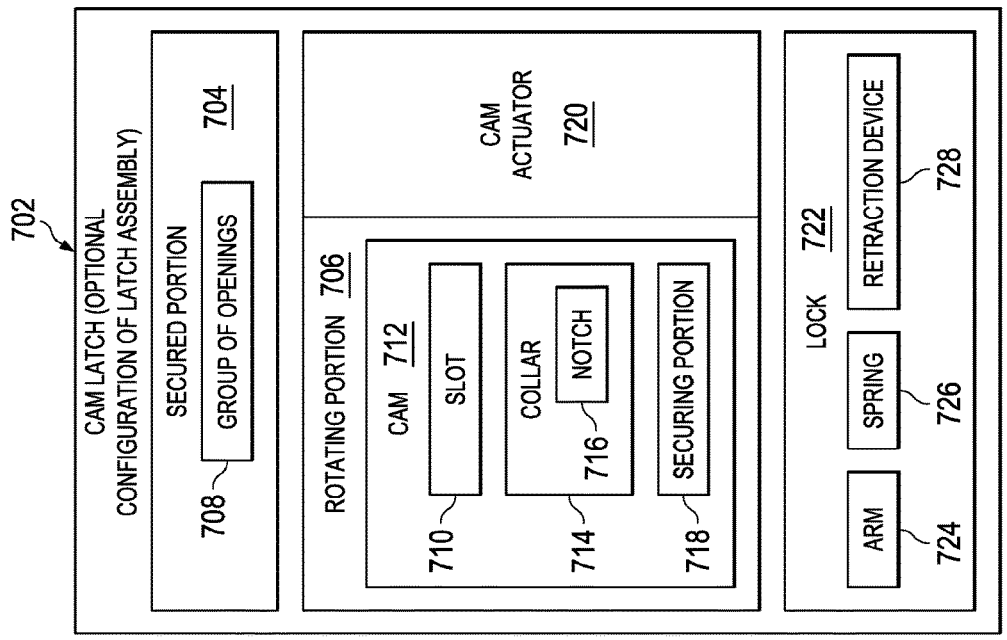
FIG. 7 is a block diagram of a latch assembly configured as a cam latch in accordance with an illustrative embodiment.

With reference now to FIG. 7, FIG. 7 is a block diagram of a latch assembly configured as a cam latch in accordance with an illustrative embodiment. More specifically, Cam latch 702 may be an example of an embodiment of latch assembly 322 of FIG. 3.

Cam latch 702 may include secured portion 704 and rotating portion 706, cam actuator 720 and lock 722. Cam latch 702 may prevent rotation of an unfixed portion, such as unfixed portion 120, unfixed portion 122, and unfixed portion 310 of FIGS. 1, 2, and 3; of a wing, such as wing 102, wing 104, and wing 300 of FIGS. 1, 2, and 3; and of an aircraft, such as aircraft 100 of FIGS. 1 and 2.

Secured portion 704 may be an example of an embodiment of secured portion 320 of FIG. 3. Secured portion 704 may be attached to second portion 318 of wing 300. Secured portion 704 may include group of openings 708 that is received by slot 710 in cam 712 of rotating portion 706 when rotating portion 706 is in open position 334, as shown in FIG. 3. Each opening in group of openings 708 may be semicircular. Cam 712 may be cylindrical. Group of openings 708 of secured portion 704 may be secured by securing portion 718 of rotating portion 706 when rotating portion 706 is in closed position 336, as shown in FIG. 3.

Rotating portion 706 may include cam 712 and securing portion 718. Rotating portion 706 may be an example of an embodiment of rotating portion 316 of FIG. 3. Rotating portion 706 may rotate between open position 334 and closed position 336. Cam actuator 720 may connect to rotating portion of cam latch 702 and may cause rotating portion 706 to rotate.

Cam 712 may include slot 710 and collar 714. Collar 714 may include notch 716. Securing portion 718 of cam 712 may secure secured portion 704 of cam latch 702 when rotating portion 706 is in closed position 336. Each slot 710 of cam 712 may receive secured portion 704 as rotating portion 706 may transition from open position 334 to closed position 336.

Lock 722 may include: arm 724, spring 726, and retraction device 728. Retraction device 728 may be a solenoid. Lock 722 arm 724 may engage notch 716 in collar 714. Spring 726 may bias arm 724 to engage notch 716 when cam 712 and connected collar 714 may be rotated to align with arm 724. Retraction device 728 may be used to extract arm 724 from notch 716 against any force exerted upon arm 724 by spring 726.

Figure 8A:
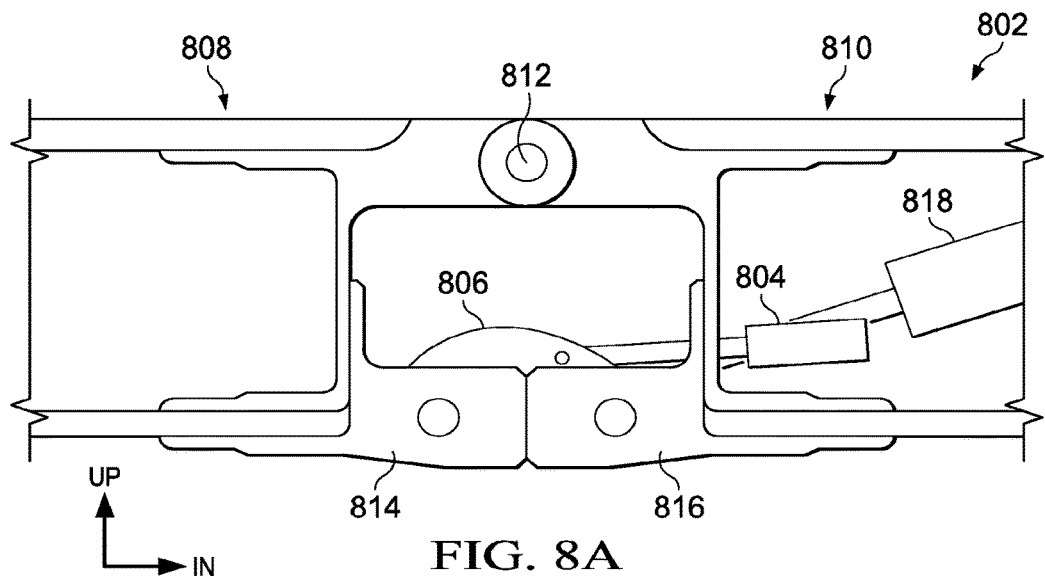
FIGS. 8A-8B are diagrams of a folding wing including a latch assembly in accordance with an illustrative embodiment.
Figure 8B:
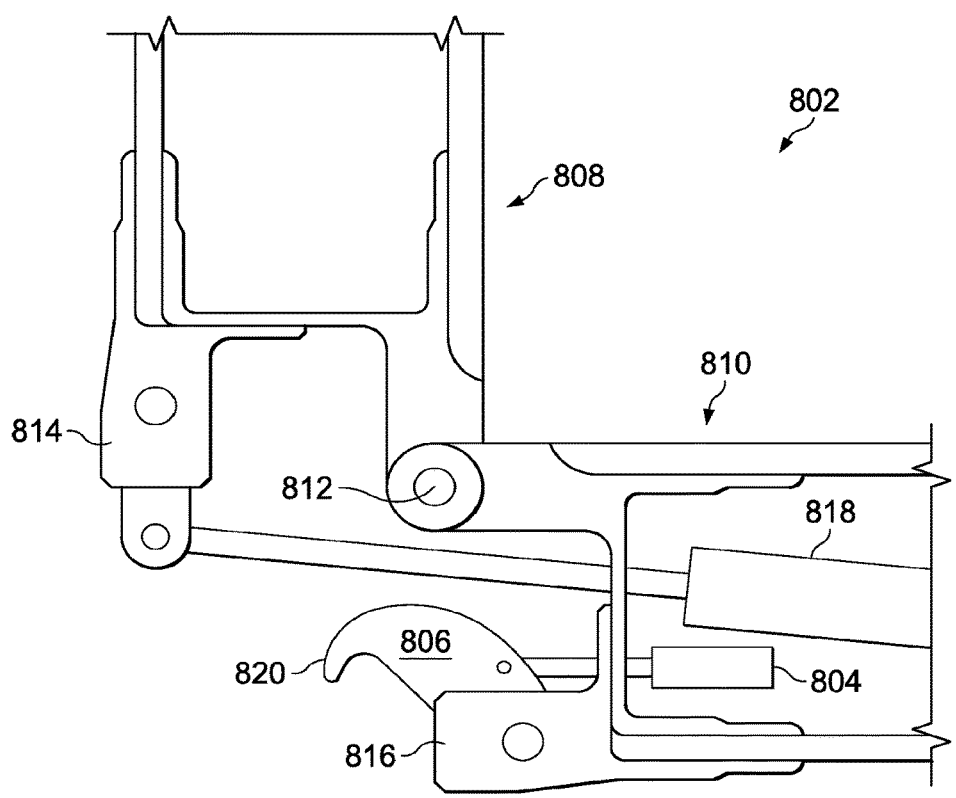

With reference now to FIGS. 8A-8B, FIGS. 8A-8B are a diagram of a folding wing including a latch assembly in accordance with an illustrative embodiment; FIG. 8A, is a diagram of the folding wing in a flight position with the latch assembly in a closed position in accordance with an illustrative embodiment; FIG. 8B is a diagram of the folding wing in a folded position, with the latch assembly in an open position in accordance with an illustrative embodiment.

More specifically, latch assembly 802 for a wing, such as wing 300 of FIG. 3, may include latch actuator 804, and rotating portion 806. Wing 300 may include unfixed portion 808 and fixed portion 810. Unfixed portion 808 may be connected to fixed portion 810 near a top side of each respective portion and rotate about fold axis 812. Latch assembly 802 may be in closed position closed position 336 shown in FIG. 8A. Closed position 336 of latch assembly 802 may secure secured portion 814 of unfixed portion 808 with securing portion 820, as shown in FIG. 8B, of rotating portion 806 of fixed portion 810. Rotating portion 806 may be mounted on a fixed portion lower-side stop 816.

Wing 300 may have fold actuator 818 located within fixed portion 810 and configured to rotate unfixed portion 808 about fold axis 812. Unfixed portion 808 may be rotated upward when rotating portion 806 is not in closed position 336. FIG. 8B shows rotating portion 806 rotated to open position 334. Rotating portion 806 may be rotated to open position 334 by retraction of latch actuator 804.

As may be shown in further detail in following figures, rotating portion 806, secured portion 814, and securing portion 820 may be configured in various manners. Latch assembly 802 may be configured as a barrel latch, as a hook latch, as a bear claw latch, or as a cam latch.

Figure 9:
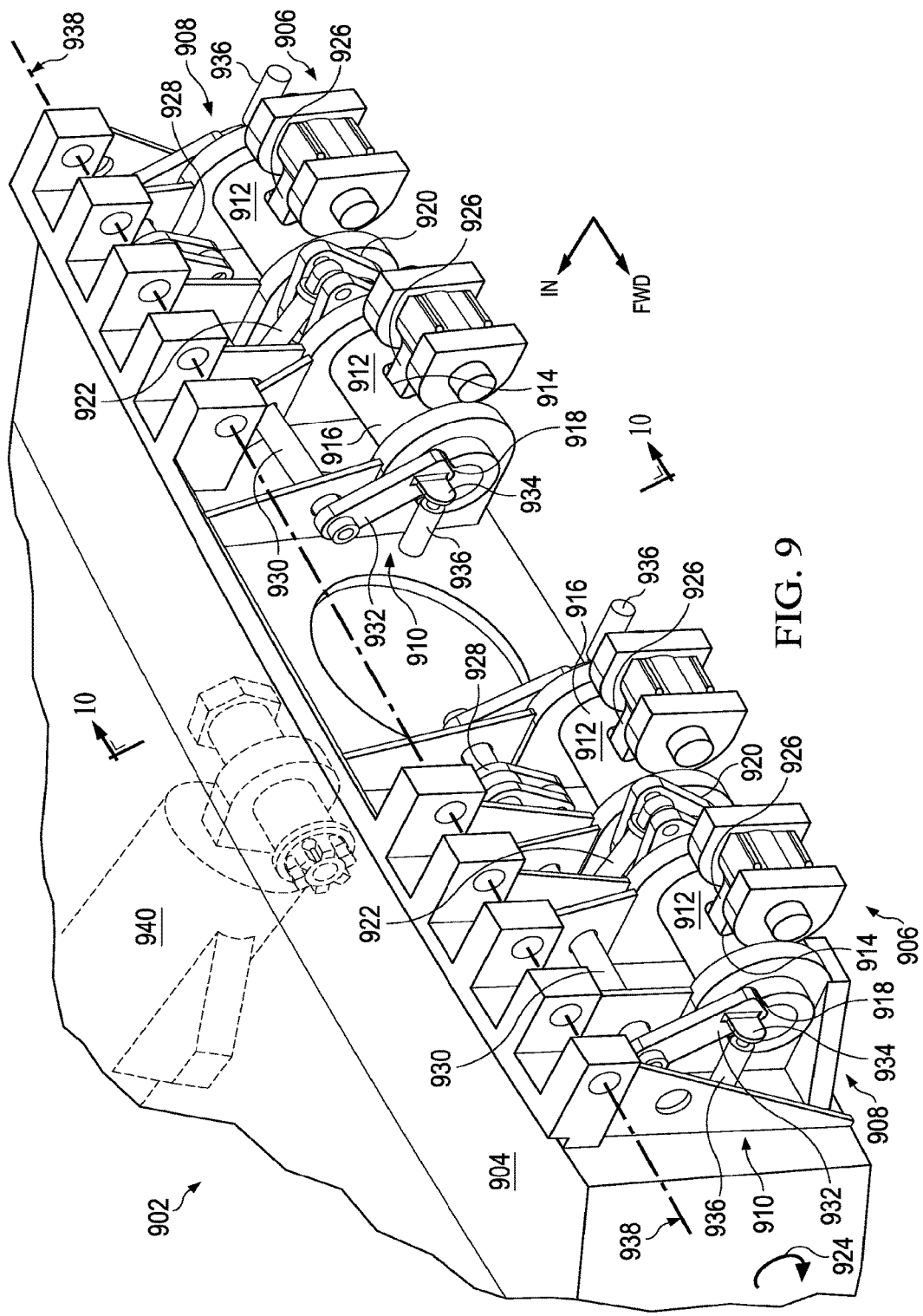
FIG. 9 is a diagram of a wing with a barrel latch, the wing almost in a flight position, the barrel latch in an open position, and a lock of the barrel latch in a disengaged position, in accordance with an illustrative embodiment.
Figure 10:
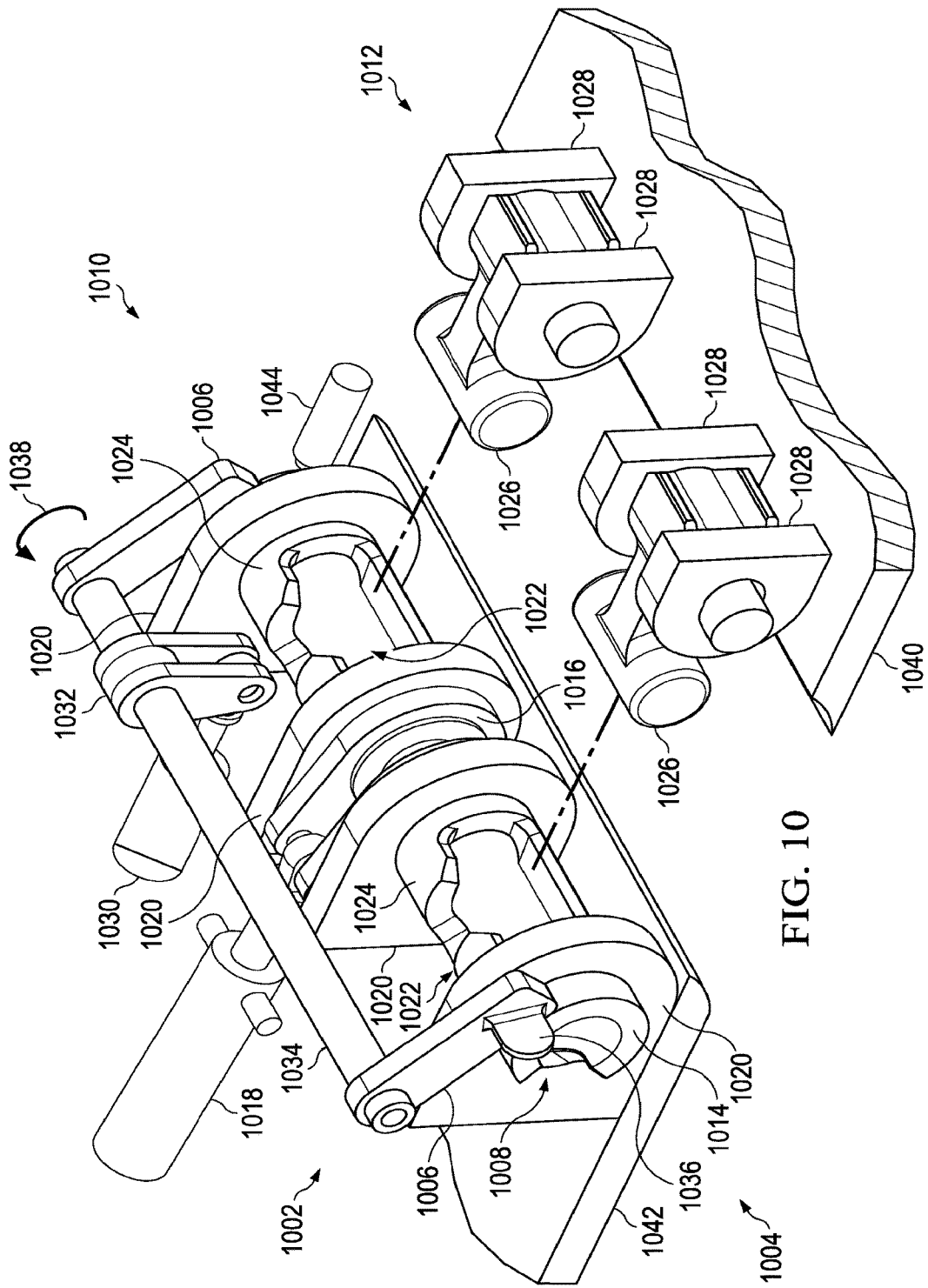
FIG. 10 is a diagram of a wing with a barrel latch, the wing not in a flight position, and the barrel latch in an open position, in accordance with an illustrative embodiment.
Figure 11:
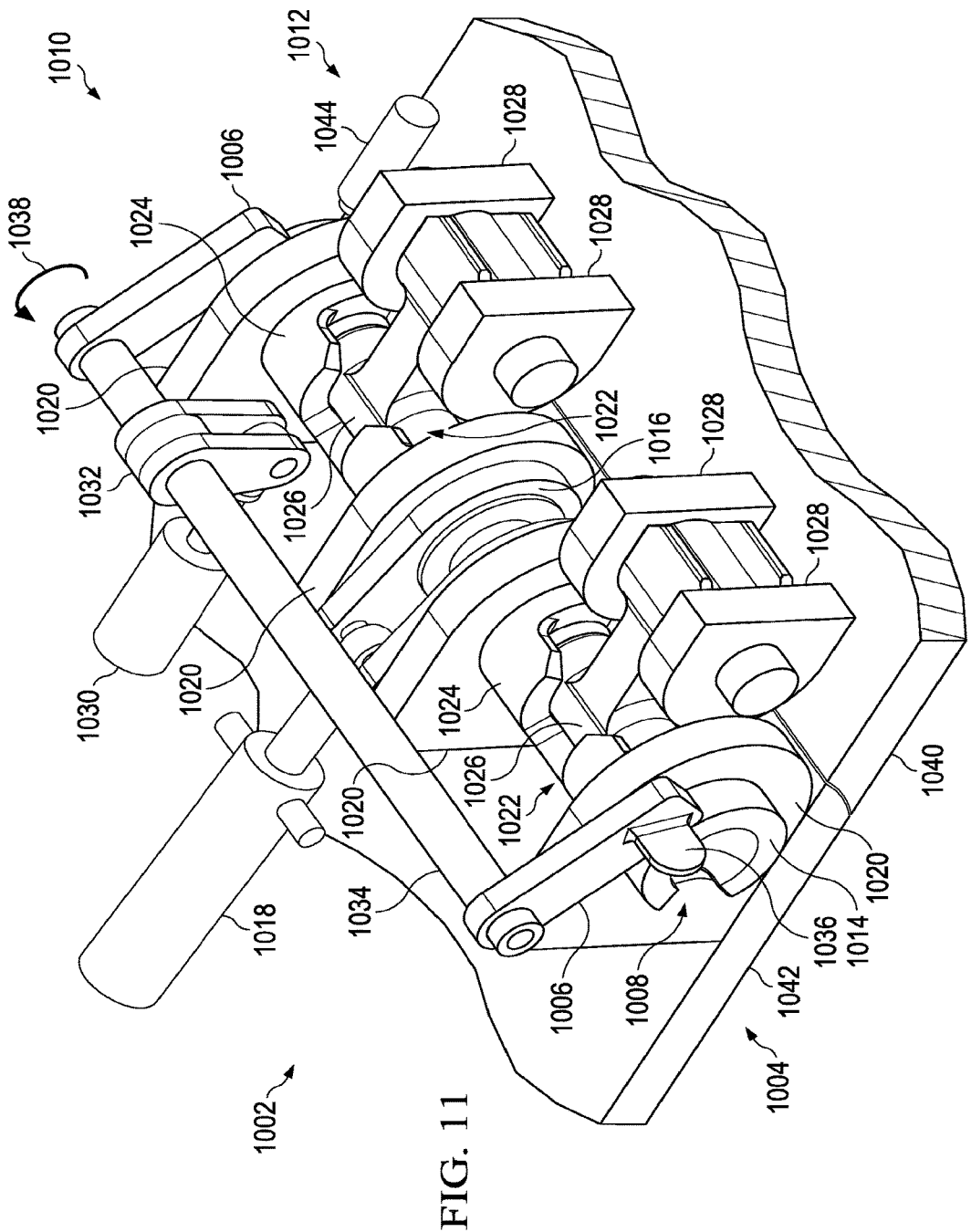
FIG. 11 is a diagram of a wing with a barrel latch, the wing in a flight position, the barrel latch in an open position, and a lock of the barrel latch in a disengaged position, in accordance with an illustrative embodiment.

With reference to FIG. 9 through FIG. 11, FIG. 9 through FIG. 11 are diagrams of a wing with a latch assembly configured as a barrel latch is depicted in accordance with an illustrative embodiment. FIG. 9 is a diagram of a wing with a barrel latch, the wing almost in a flight position, the barrel latch in the open position, and a lock of the barrel latch in a disengaged position, in accordance with an illustrative embodiment. FIG. 10 is a diagram of a wing with a barrel latch, the wing in a flight position, the barrel latch in the open position, and a lock of the barrel latch in a disengaged position, in accordance with an illustrative embodiment. FIG. 11 is a diagram of a wing with a barrel latch, the wing in a flight position, the barrel latch in a closed position, and a lock of the barrel latch in an engaged position, in accordance with an illustrative embodiment.

With reference to FIG. 9, FIG. 9 is a diagram of a wing with a barrel latch, the wing almost in a flight position, the barrel latch in the open position, and a lock of the barrel latch in a disengaged position, in accordance with an illustrative embodiment.

More specifically, FIG. 9 shows a perspective view diagram of a latch assembly connected to a fixed portion of a wing, where barrel latch 902 may be an example of an embodiment of latch assembly 322 of FIG. 3. For better viewing of barrel latch 902, unfixed portion 310 of wing 300, as shown in FIG. 3, is cut away and not shown in the foreground of FIG. 9. However, secured portion 906, which may be connected to unfixed portion 310, is shown engaged with rotating portion 908. Lock 910 is shown engaged with rotating portion 908. Also shown is fold actuator 940, which may connect to unfixed portion 310.

Unfixed portion 310 of FIG. 3 (cutaway and not shown in FIG. 9) may connect to fixed portion 904 at fold axis 938. Fold actuator 940 may move unfixed portion 310 between flight position 302 and folded position 304 by rotating unfixed portion 310 about fold axis 938.

Barrel latch 902 may include secured portion 906, rotating portion 908, lock 910, and barrel actuator 922 (portions of barrel actuator 922 that are located within fixed portion 904 are not shown in FIG. 9, to enhance visual clarity of FIG. 9). Rotating portion 908 may include barrel 912. Barrel 912 may include slot 914, securing portion 916, notch 918, and barrel lug 920. Barrel 912 may be cylindrically shaped. Rotating portion 908 may be an embodiment of rotating portion 316 of FIG. 3.

Secured portion 906 may include T-shaped end 926. In FIG. 9, T-shaped end 926 is shown cut away from unfixed portion 310. Secured portion 906 may be an example of an embodiment of secured portion 320 of FIG. 3. Secured portion 906 may be attached to a second portion, such as second portion 318 of wing 300 of FIG. 3.

Lock 910 may include rod lug 928, rod 930, and arm 932. Arm 932 may include target 934. Target 934 may be sensed by target/position sensor 936. Target 934 may be on every arm 932 or on less than every arm 932, of barrel latch 902. Sensor 936 may sense proximity of target 934 and may indicate that lock 910 may be in engaged position 330 of FIG. 3. Sensor 936 may be mounted on fixed portion 904, and may be mounted on a forward side or on an aft side of barrel 912 so as to be able to sense target 934 mounted on arm 932. Limiting target 934 and sensor 936 to being on less than every arm 932 may reduce an overall weight of barrel latch 902.

Barrel latch 902 may prevent rotation an unfixed portion 310 and a wingtip, such as unfixed portion 120, unfixed portion 122, unfixed portion 310, and wingtip 312, of FIGS. 1, 2, and 3; of a wing, such as wing 102, wing 104, and wing 300 of FIGS. 1, 2, and 3.

Lock 910 may engage rotating portion 908 of barrel latch 902 when rotating portion 908 may be in closed position 336. Lock 910 may prevent rotation of rotating portion 908 of barrel latch 902 when lock 910 is engaged with notch 918 in barrel 912.

Barrel 912 may be rotated by motion of barrel actuator 922. Barrel actuator 922 may connect to barrel lug 920. Barrel lug 920 may be an extension of barrel 912. In the example shown in FIG. 9, extending the barrel actuator 922 may rotate barrel 912 in the direction shown by arrow 924. In the example shown in FIG. 9, barrel actuator 922 may be fully extended, and further rotation of barrel 912 in a direction indicated by arrow 924 may be impeded by T-shaped end 926 of secured portion 906. Retracting barrel actuator 922 may rotate barrel 912 opposite the direction indicated by arrow 924.

Rotating portion 908 may rotate between open position 334 and closed position 336. Securing portion 916 of rotating portion 908 may secure secured portion 906 of barrel latch 902 when rotating portion 908 is in closed position 336. Slot 914 of rotating portion 908 may receive secured portion 906 when rotating portion 908 may be in closed position 336. Amount of barrel rotation, and/or position of barrel may be sensed by sensor 936.

T-shaped end 926 may be received by slot 914 of rotating portion 908 when rotating portion 908 is in open position 334. T-shaped end 926 of secured portion 906 may be secured by securing portion 916 of rotating portion 908 when rotating portion 908 may be in closed position 336.

With reference to FIG. 10, FIG. 10 is a diagram of a wing with a barrel latch, the wing not in a flight position, and the barrel latch in an open position, in accordance with an illustrative embodiment. More specifically, FIG. 10 shows a perspective zoomed-in view on one half of barrel latch 1002, marked as view 10-10 in FIG. 9. Fixed portion 1042 is shown not in contact with unfixed portion 1040, as may be the case just before reaching or just after leaving flight position.

Figure 12:
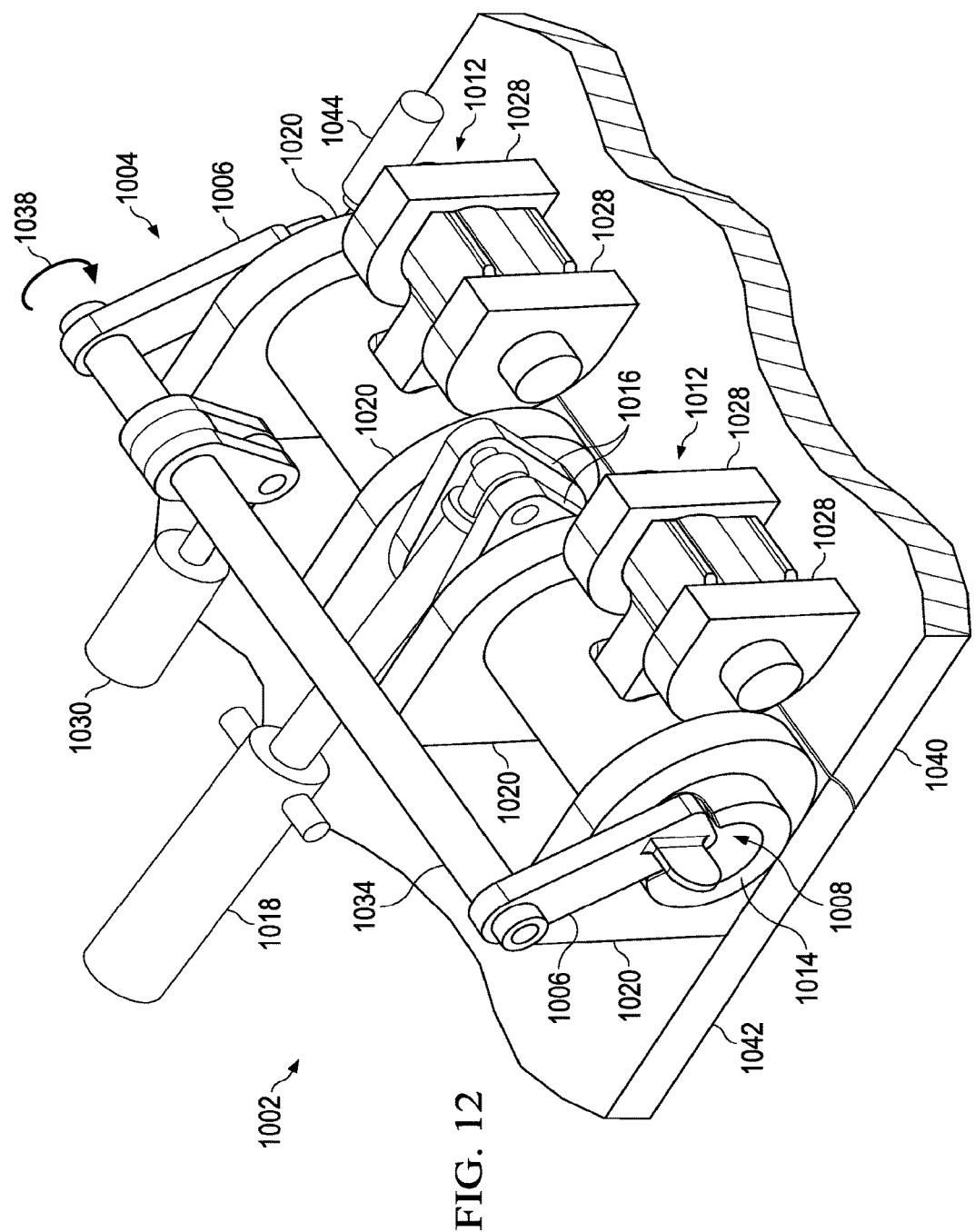
FIG. 12 is a diagram of a wing with a barrel latch, the wing in a flight position, the barrel latch in a closed position, and a lock of the barrel latch in an engaged position, in accordance with an illustrative embodiment.

For clarity of viewing barrel latch 1002, only a cutaway part of a lower side of unfixed portion 1040, and only a cutaway part of a lower side of fixed portion 1042 are shown in FIGS. 10-12. Because the perspective view and numbered components remain the same in FIGS. 10-12, but some component positions may change, item numbers in FIG. 10 are carried on through FIG. 11 and FIG. 12.

In FIG. 10, barrel latch 1002 is shown in open position 334 with lock 1004 in disengaged position 332. Lock 1004 may be in disengaged position 332 when arm 1006 may not be engaged in notch 1008.

Similar to FIG. 9, barrel latch 1002 may include: rotating portion 1010, secured portion 1012, and lock 1004. Rotating portion 1010 may include: barrel 1014, barrel lug 1016, barrel actuator 1018, and outer lug 1020. Barrel may include slot 1022, securing portion 1024, and notch 1008. Secured portion 1012 may include T-shaped end 1026, and inner lug 1028. Lock 1004 may include: lock actuator 1030, rod lug 1032, rod 1034, arm 1006, and target 1036.

Barrel lug 1016 may extend from barrel 1014. Barrel lug 1016 may be connected to barrel actuator 1018. Outer lug 1020 may be connected to fixed portion 306 of wing 300 of FIG. 3. Inner lug 1028 may be connected to unfixed portion 310 of wing 300 of FIG. 3.

Lock 1004 may be in disengaged position 332 when barrel actuator 1018 may extend and rod 1034 may be rotated in direction indicated by arrow 1038. Rod 1034 may lift arm 1006 up away from barrel 1014. With arm 1006 up away from barrel 1014, arm 1006 may not be engaged with notch 1008.

When arm 1006 may be disengaged from notch 1008, barrel actuator 1018 may retract and rotate barrel 1014 in direction indicated by arrow 1038. Barrel 1014 rotating in direction indicated by arrow 1038, may rotate notch 1008 back away from arm 1006 to position of arm 1006 as shown in FIG. 10.

Because secured portion 1012 may be connected to unfixed portion 1040, when barrel latch 1002 is in position shown in FIG. 10, with securing portion 1024 of rotating portion 1010 rotated away from secured portion 1012, and slot 1022 positioned so that secured portion 1012 may be withdrawn from barrel 1014, then secured portion 1012 may be withdrawn from barrel 1014 as unfixed portion 1040 is rotated away from fixed portion 1042, and wing 300 moves toward folded position 304.

Also shown is target/position sensor 1044. Sensor 1044 may sense a position and/or an amount of rotation of barrel 1014. Sensor 1044 may sense the position and/or the amount of rotation of barrel 1014 via mechanical, electrical, optical, sonic, magnetic, other appropriate means, or any combination thereof. Sensor 1044 may be located at any point along barrel 1014, and more than one sensor 1044 may be used. Sensor 1044 may be mounted on unfixed portion 310 of wing 300.

One target/position sensor 1044 is omitted in FIG. 10 to allow better viewing of notch 1008. As mentioned above, each arm 1006 may have target 1036, and each target 1036 may have sensor 1044 connected to fixed portion 306. Sensor 1044 may sense the position of target 1036 on arm 1006 via mechanical, electrical, optical, sonic, magnetic, other appropriate means, or any combination thereof.

With reference to FIG. 11, FIG. 11 is a diagram of a wing with a barrel latch, the wing in a flight position, the barrel latch in the open position, and a lock of the barrel latch in a disengaged position, in accordance with an illustrative embodiment. More specifically FIG. 11 is a perspective zoomed-in view on one half of barrel latch 1002, marked as view 10-10 in FIG. 9.

In FIG. 11, barrel latch 1002 is shown in open position 334 with lock 1004 in disengaged position 332. Lock 1004 may be in disengaged position 332 when arm 1006 may not be engaged in notch 1008. FIG. 11 differs from FIG. 10 by showing T-shaped end 1026 engaged in slot 1022 of barrel 1014 before rotating portion 1010 has rotated securing portion 1024 to secure T-shaped end 1026 within barrel 1014.

Because secured portion 1012 may be connected to unfixed portion 1040, when barrel latch 1002 is in position shown in FIG. 11, with securing portion 1024 of rotating portion 1010 rotated away from secured portion 1012, and slot 1022 positioned so that secured portion 1012 may be withdrawn from barrel 1014, then secured portion 1012 may be withdrawn from barrel 1014 (as shown in FIG. 10) as unfixed portion 1040 is rotated away from fixed portion 1042, and wing 300 moves toward folded position 304.

One target/position sensor 1044 is omitted in FIG. 11 to allow better viewing of notch 1008. As mentioned above, each arm 1006 may have target 1036, and each target 1036 may have sensor 1044 connected to fixed portion 306. Sensor 1044 may sense the position of target 1036 on arm 1006 via mechanical, electrical, optical, sonic, magnetic, other appropriate means, or any combination thereof.

With reference to FIG. 12, FIG. 12 is a diagram of a wing with a barrel latch, the wing in a flight position, the barrel latch in a closed position, and a lock of the barrel latch in an engaged position, in accordance with an illustrative embodiment. The numbering for items in FIG. 10 is retained and carried on through FIG. 12. More specifically, secured portion 1012 is shown engaged by securing portion 1024 of barrel 1014, and arm 1006 is shown engaged with notch 1008.

Among the ways that FIG. 12 differs from FIG. 10, is that when barrel latch 1002 is in closed position 336 with lock 1004 in engaged position 330, as shown in FIG. 12, unfixed portion 1040 may be secured against, and cannot be rotated away from, fixed portion 1042. With barrel latch 1002 configured as shown in FIG. 12, wing 300 may be secured in flight position 302 and fold actuator 818 of FIG. 8, may not push unfixed portion 310 up to folded position 304.

With lock 1004 in engaged position 330 as shown in FIG. 12, lock actuator 1030 may be retracted. Retraction of lock actuator may pull rod lug 1032 back toward fixed portion 306 and rotate rod 1034 in direction indicated by arrow 1038. Rotation of rod 1034 in direction indicated by arrow 1038 may rotate arm 1006 down to engage in notch 1008 when barrel 1014 may be rotated to closed position 336 as it is shown FIG. 12.

In FIG. 12, inner lug 1028 can be seen nested inside of outer lug 1020. Inner lug 1028 nesting in outer lug 1020 may transfer torsion between secured portion 1012 and rotating portion 1010.

Inner lug 1028 nesting in outer lug 1020 may assist transmission a torsional load, as well as a forward and an aft shear load, secured portion 1012 and rotating portion 1010, and may reduce an amount of torsion and an amount of stress between T-shaped end 1026 and securing portion 1024.

Figure 13:
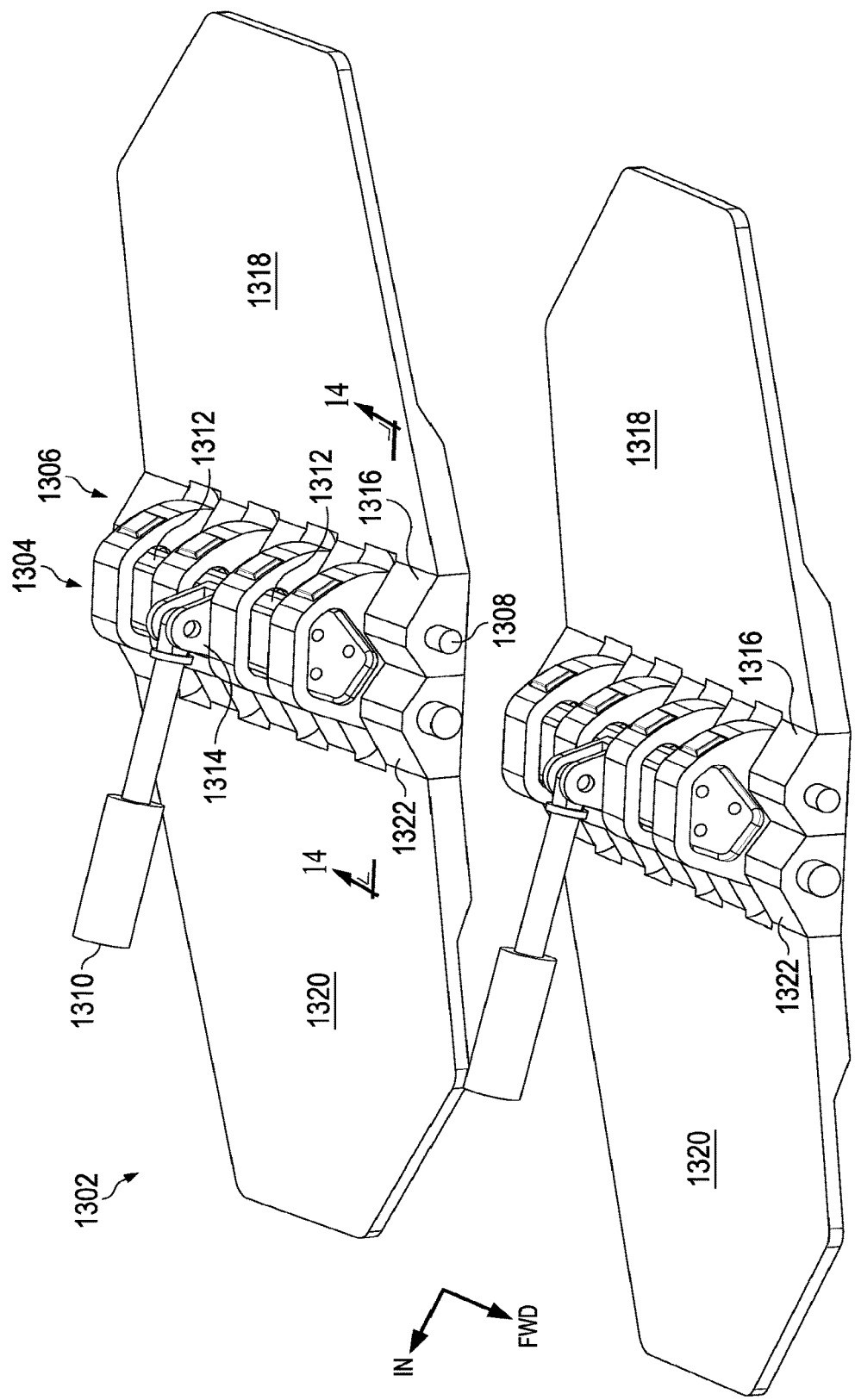
FIG. 13 is a diagram of a perspective view from above looking aft inside a cutaway of a wing with a hook latch, the wing in a flight position, and the hook latch in a closed position, in accordance with an illustrative embodiment.
Figure 14:
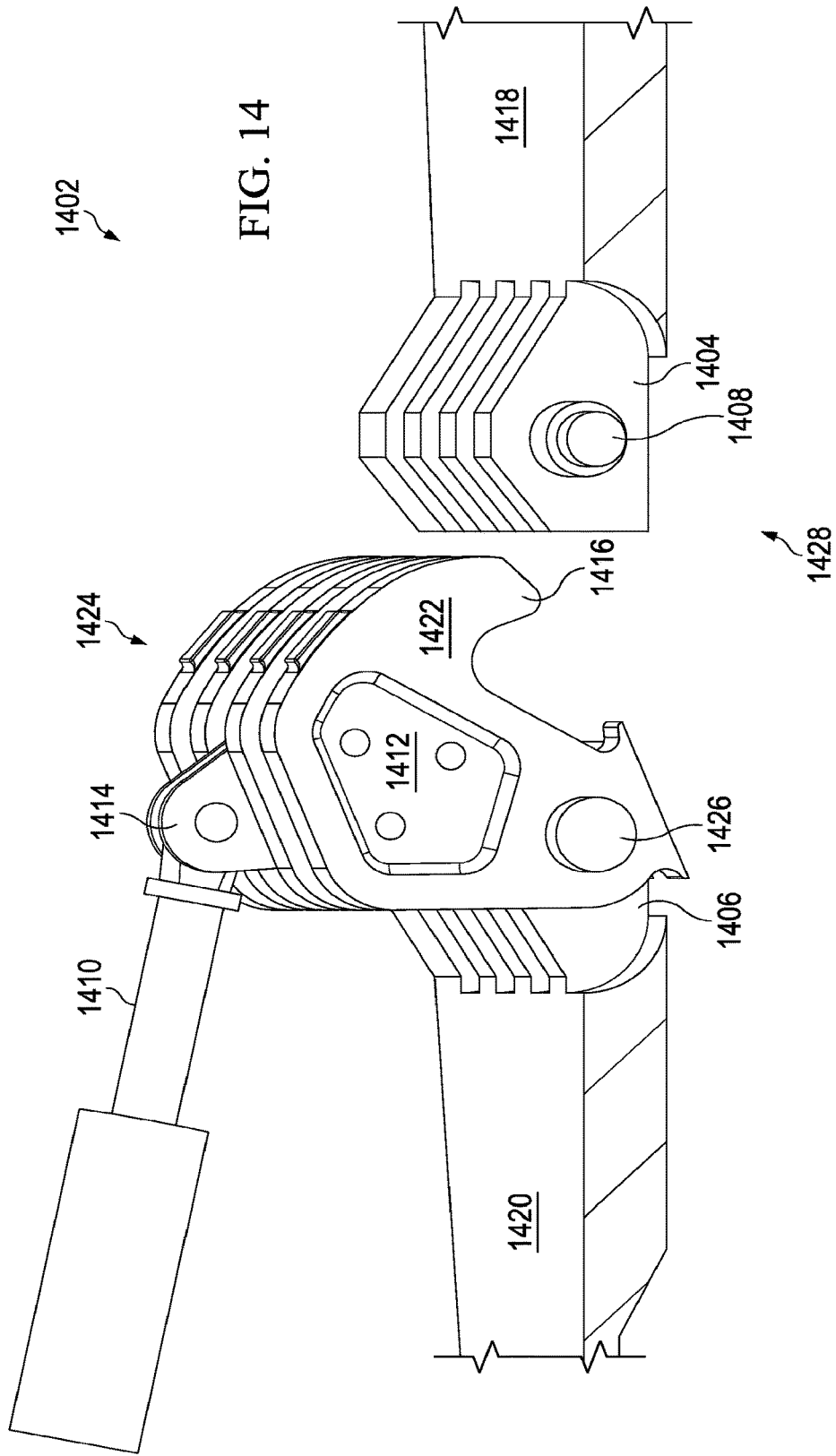
FIG. 14 is a diagram of a perspective view from above looking aft inside a cutaway of a wing with a hook latch, zoomed in on one-half of FIG. 13, the wing not in a flight position, and the hook latch in an open position, in accordance with an illustrative embodiment.
Figure 15:
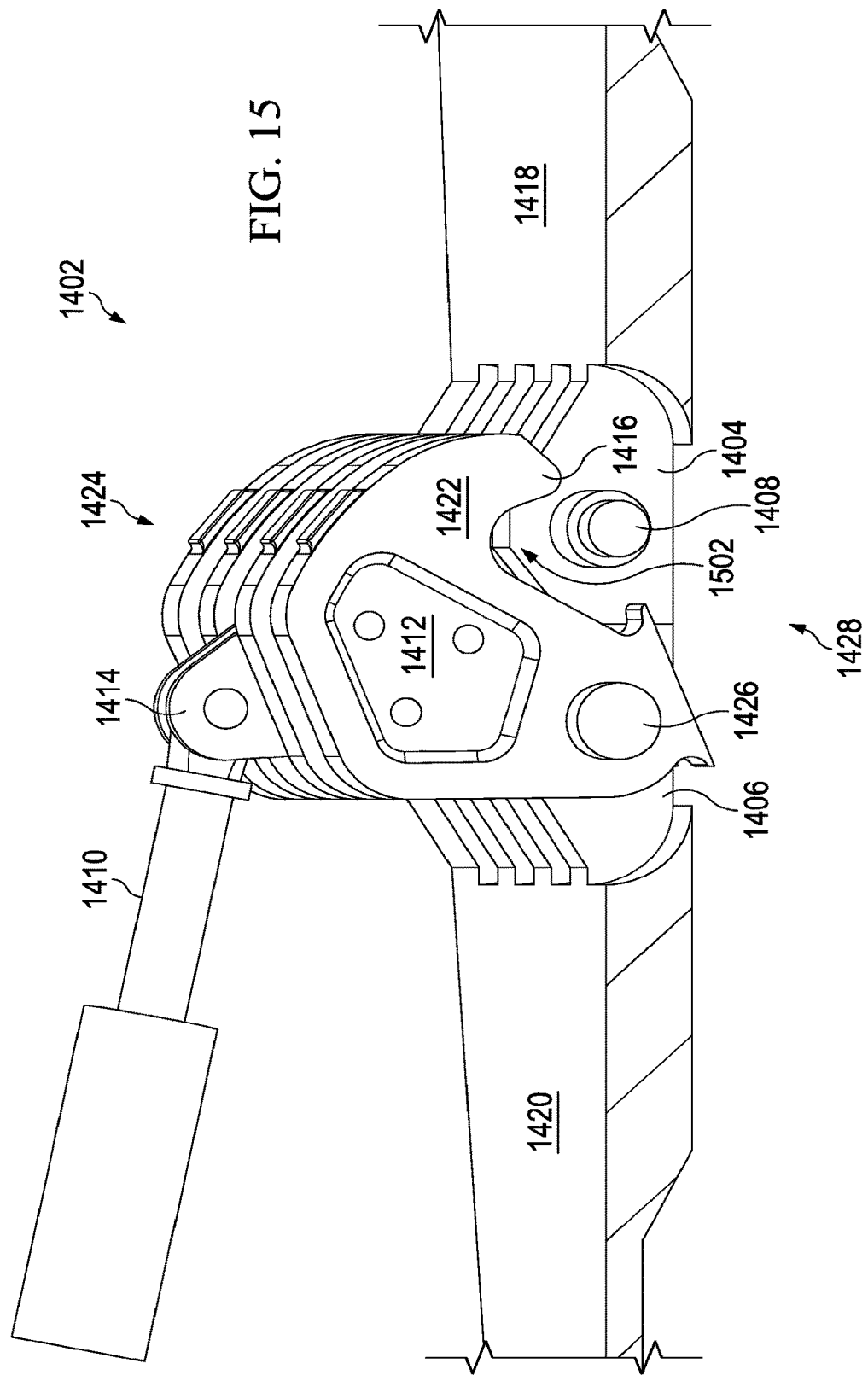
FIG. 15 is a diagram of a perspective view from above looking aft inside a cutaway of a wing with a hook latch, zoomed in on one-half of FIG. 13, the wing in a flight position, and the hook latch in an open position, in accordance with an illustrative embodiment.

With reference to FIGS. 13 through 17, FIG. 13 is a diagram of a perspective view from above looking aft inside a cutaway of a wing with a hook latch, the wing in a flight position, and the hook latch in a closed position, in accordance with an illustrative embodiment. FIG. 14 is a diagram of a perspective view from above looking aft inside a cutaway of a wing with a hook latch, zoomed in on one-half of FIG. 13, the wing not in a flight position, and the hook latch in an open position, in accordance with an illustrative embodiment. FIG. 15 is a diagram of a perspective view from above looking aft inside a cutaway of a wing with a hook latch, zoomed in on one-half of FIG. 13, the wing in a flight position, and the hook latch in an open position, in accordance with an illustrative embodiment. FIGS. 14-16 retain the perspective and same elements at FIG. 13, but some elements may be shown in changed positions, thus the item numbers in FIG. 14 are carried over in FIG. 15 and FIG. 16. FIG. 16 is a diagram of a perspective view from above looking aft inside a cutaway of a wing with a hook latch, zoomed in on one-half of FIG. 13, the wing in a flight position, and the hook latch in a closed position, in accordance with an illustrative embodiment.

Figure 17A:
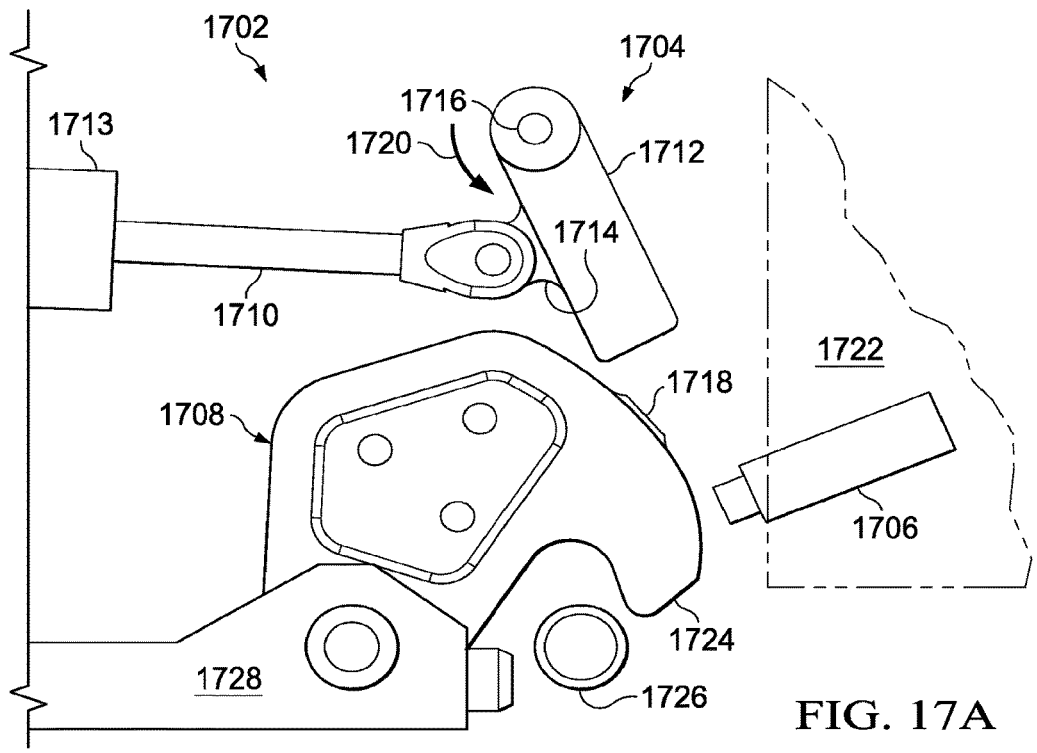
FIGS. 17A-17B are diagrams of a side view of a hook latch for a folding wing, in accordance with an illustrative embodiment.
Figure 17B:
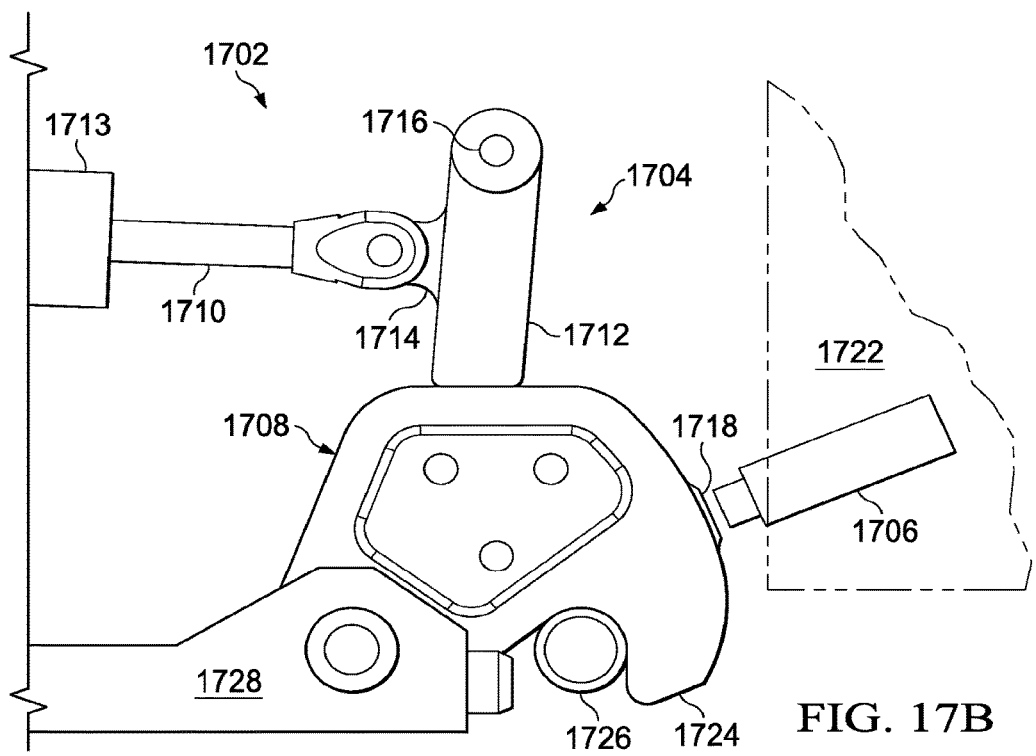

FIGS. 17A-17B are a diagram of a side view of a hook latch, in accordance with an illustrative embodiment; FIG. 17A is a diagram of a side view of a hook latch in transition between an open position and a closed position, with a lock of the hook latch in a disengaged position, in accordance with an illustrative embodiment; and FIG. 17B is a diagram of a side view of a hook latch in the closed position, with a lock of the hook latch in an engaged position, in accordance with an illustrative embodiment.

With reference to FIG. 13, FIG. 13 is a diagram of a perspective view from above looking aft inside a cutaway of a wing with a hook latch, the wing in a flight position, and the hook latch in a closed position, in accordance with an illustrative embodiment. More specifically, hook latch 1302 may be an embodiment of latch assembly 322 of FIG. 3. To enable clearer visualization of hook latch components, lock 326 as presented in FIG. 3, is not presented in FIG. 13.

Hook latch 1302 may include rotating portion 1304, secured portion 1306, latch bar 1308, latch actuator 1310, rotation bar 1312, lug 1314, unfixed portion lower-side stop 1316, unfixed portion 1318, fixed portion 1320, and fixed portion lower-side stop 1322. Fixed portion 1320 may be comprised by first portion 314 of FIG. 3.

Unfixed portion 1318 may be comprised by second portion 318 of FIG. 3; of a wing, such as wing 102, wing 104, and wing 300 of FIGS. 1, 2, and 3; and of an aircraft, such as aircraft 100 of FIGS. 1 and 2. Hook latch 1302 may prevent rotation of unfixed portion 1318.

Rotating portion 1304 may be an embodiment of rotating portion 316 of FIG. 3. Rotating portion 1304 may rotate between open position 334 and closed position 336. Rotating portion 1304 may be attached to rotation bar 1312. Rotation bar 1312 may include a lug 1314. Lug 1314 may connect to latch actuator 1310. Thus, latch actuator 1310 may move lug 1314 and move any rotating portion 1304 connected to rotation bar 1312.

Rotation bar 1312 may be rotated by latch actuator 1310 and may engage rotating portion 1304 with latch bar 1308 of secured portion 1306. Rotation bar 1312 may be used to rotate a group of one or more rotating portion 1304 in embodiments that may use more than one rotating portion 1304, as shown in FIG. 12.

Secured portion 1306 may include latch bar 1308. Latch bar may be secured in unfixed portion lower-side stop 1316 of secured portion 1306. Secured portion 1306 may be an embodiment of secured portion 320 of FIG. 3. Secured portion 1306 may be attached to unfixed portion 1318, which may be second portion 318 of FIG. 3.

With reference now to FIG. 14, FIG. 14 is a diagram of a perspective view from above looking aft inside a cutaway of a wing with a hook latch, zoomed in on one-half of FIG. 13, the wing not in a flight position, and the hook latch in an open position, in accordance with an illustrative embodiment. More specifically, FIG. 14 presents view 14-14 of hook latch 1302 as marked in FIG. 13, with unfixed portion lower-side stop 1316, and fixed portion lower-side stop 1322 cutaway, and two significant changes from the view presented in FIG. 13. View 14-14 of FIG. 13 is changed in FIG. 14 by unfixed portion 1418 being shown moved out of flight position 302 and away from fixed portion 1420 after hook latch 1402 was moved to open position 334, from the closed position 336, of FIG. 3, as shown in FIG. 13. Additionally, to enable clearer visualization of hook latch components, lock 326 as presented in FIG. 3, is not presented in FIG. 14.

Hook latch 1402 may include: unfixed portion lower-side stop 1404, fixed portion lower-side stop 1406, latch bar 1408, latch actuator 1410, rotation bar 1412, lug 1414, hook 1416, unfixed portion 1418, fixed portion 1420, securing portion 1422, of rotating portion 1424, rotation axis 1426, and secured portion 1428.

Rotating portion 1424 may include securing portion 1422, which may include hook 1416. As shown in FIG. 14, hook 1416 may disengage from latch bar 1408 when latch actuator 1410 is in an extended position. When latch actuator 1410 is in a retracted position, lug 1414 may be moved toward fixed portion 1420, and rotation bar 1412 may be rotated to the position shown. Rotation bar 1412 in position shown in FIG. 14 may be open position 334. In open position 334, each rotating portion 1424 may retract each hook 1416 fully from any engagement with latch bar 1408 such that secured portion 1428 may be moved away from rotating portion 1424, and unfixed portion lower-side stop 1404 may move away from contact with fixed portion lower-side stop 1406. When unfixed portion lower-side stop 1404 is not in contact with fixed portion lower-side stop 1406, wing 300 may not be in flight position 302, and aircraft may not be ready for flight.

Securing portion 1422 may be an embodiment of securing portion 328 of FIG. 3. Each additional securing portion 1422 that may be connected to rotation bar 1412, may increase redundancy for any single securing portion 1422 connected to rotation bar 1412. Optimizing the strength of each securing portion 1422 connected to rotation bar 1412 against a selection of a quantity of securing portion 1422, may allow wing 300 to have a folding capability and remain secured in flight position 302 throughout a flight, with fewer components and/or at a lower weight than currently existing wing fold systems and latch assemblies.

With reference now to FIG. 15, FIG. 15 is a diagram of a perspective view from above looking aft inside a cutaway of a wing with a hook latch, zoomed in on one-half of FIG. 13, the wing in a flight position, and the hook latch in an open position, in accordance with an illustrative embodiment. More specifically, FIG. 15 shows hook latch 1402 as presented in FIG. 14, except hook latch 1402 is shown with wing 300 in flight position 302. Therefore, items in FIG. 15 carry the same numbers as presented in FIG. 14. To enable clearer visualization of hook latch 1402 components, lock 326 as presented in FIG. 3, is not presented in FIG. 15.

FIG. 15 shows that hook latch 1402 may also include slot 1502. Slot 1502 may be comprised by rotating portion 1424.

FIG. 15 differs from FIG. 13 in that latch actuator 1410 is shown retracted. With latch actuator 1410 retracted, lug 1414 may be pulled back away from unfixed portion 1418, and rotation bar 1412 may move up and away from secured portion 1428, and may rotate about rotation axis 1426, until reaching open position 334, as shown in FIG. 15. When rotation bar 1412 rotates away from secured portion 1428, slot 1502 may move up and away from latch bar 1408. When latch bar 1408 is no longer encompassed within slot 1502, securing portion 1422 and hook 1416 may no longer secure rotating portion 1424 to secured portion 1428.

When rotating portion 1424 is up and away from secured portion 1428, hook latch 1402 may be in open position 334, and unfixed portion 1418 may be moved away from fixed portion 1420 by fold actuator 340, out of flight position 302 to folded position 304 of FIG. 3.

Latch bar 1408 may be received by slot 1502 of rotating portion 1424 when rotating portion 1424 transitions between open position 334 and closed position 336. Latch bar 1408 of secured portion 1428 may be secured by securing portion 1422 of rotating portion 1424 when rotating portion 1424 is in closed position 336, as previously shown in FIG. 13.

Securing portion 1422 may secure latch bar 1408 of secured portion 1428 of hook latch 1402 when rotating portion 1424 is in closed position 336. Slot 1502 of rotating portion 1424 may receive secured portion 1428 when rotating portion 1424 may transition between open position 334 and closed position 336.

With reference now to FIG. 16, FIG. 16 is a diagram of a perspective view from above looking aft inside a cutaway of a wing with a hook latch, zoomed in on one-half of FIG. 13, the wing in a flight position, and the hook latch in a closed position, in accordance with an illustrative embodiment. More specifically, FIG. 16 presents view 14-14 of hook latch 1302 as marked in FIG. 13, with unfixed portion lower-side stop 1404, and fixed portion lower-side stop 1406 cutaway. To enable clearer visualization of hook latch components, lock 326 as presented in FIG. 3, is not presented in FIG. 16. Additionally, FIG. 16 retains the perspective and same elements at FIG. 14, but some elements may be in changed positions, thus the item numbers in FIG. 14 are carried over in FIG. 16.

As shown in FIG. 14, hook 1416 may engage latch bar 1408 when latch actuator 1410 is in an extended position. When latch actuator 1410 is in the extended position, lug 1414 may be moved fully toward unfixed portion 1418, and rotation bar 1412 may be rotated to the position shown. Rotation bar 1412, in position shown in FIG. 14 may be closed position 336. In closed position 336, each rotating portion may have hook 1416 fully engaged with latch bar 1408 such that secured portion 1428 may not be moved away from rotating portion 1424, and unfixed portion lower-side stop 1404 may remain in contact with fixed portion lower-side stop 1406. When unfixed portion lower-side stop 1404 remains in contact with fixed portion lower-side stop 1406, wing 300 may be in flight position 302, and aircraft may be ready for flight.

Securing portion 1422 may be an embodiment of securing portion 328 of FIG. 3. Each additional securing portion 1422 that may be connected to rotation bar 1412, may increase redundancy for any single securing portion 1422 connected to rotation bar 1412. Optimizing the strength of each securing portion 1422 connected to rotation bar 1412 against a selection of a quantity of securing portion 1422, may allow wing 300 to have a folding capability and remain secured in flight position 302 throughout a flight, with fewer components and/or at a lower weight than currently existing wing fold systems and latch assemblies.

With reference now to FIG. 17, FIG. 17 is a diagram of a side view of a hook latch, in accordance with an illustrative embodiment; FIG. 17A is a diagram of a side view of a hook latch in transition between an open position and a closed position, with a lock of the hook latch in a disengaged position, in accordance with an illustrative embodiment; and FIG. 17B is a diagram of a side view of a hook latch in the closed position, with a lock of the hook latch in an engaged position, in accordance with an illustrative embodiment. More specifically, of hook latch 1702 is shown without latch actuator 1310/1410, lug 1314/1414, fixed portion 1320/1420, and unfixed portion lower-side stop 1316 (as shown in FIG. 13 and FIG. 14) to enable viewing clarity of lock 1704 and lock/latch sensor 1706.

Hook latch 1702 may include: lock 1704, sensor 1706, and rotating portion 1708. Lock 1704 may include lock actuator 1710 and pawl 1712. Pawl 1712 may include an extension, pawl lug 1714, and latch rotation axis 1716. Rotating portion 1708 may include target 1718.

When, as in FIG. 17A, lock actuator 1710 may be in an extended position, pawl lug 1714 may be pushed to the right such that pawl 1712 may rotate in a direction indicated by arrow 1720 about latch rotation axis 1716, and pawl 1712 may rise so as to not make contact with rotating portion 1708. Lock 1704 may be in disengaged position 332, as shown in FIG. 3, when pawl 1712 is not in contact with rotating portion 1708.

In FIG. 17A, rotating portion 1708 is not in open position 334 because hook 1724 has not raised enough to allow latch bar 1726 to move away from fixed portion lower-side stop 1728. In open position 334, rotating portion 1708 may be rotated up and toward fixed portion 306 enough so that hook 1724 may be above latch bar 1726 sufficiently to allow fold actuator 340 to move unfixed portion 1722 away from fixed portion without latch bar 1726 contacting hook 1724 or any part of rotating portion 1708.

Sensor 1706 may be mounted on unfixed portion 1722. In the position shown in FIG. 17A, sensor 1706 may sense that target 1718 on rotating portion 1708 is not in a position that corresponds to closed position 336 for hook latch 1702. Sensor 1706 may indicate a status that hook latch 1702 may be not in closed position 336 when target 1718 is not properly aligned with sensor 1706. Wing 300 may be considered not ready for flight when hook latch 1302 may be not in closed position 336.

Sensor 1706 may sense target 1718 mechanically, electronically, ultrasonically, optically, by other appropriate means, or by any combination thereof. When sensor 1706 senses target 1718 via non-mechanical means, reliability may be increased, and weight of sensor 1706 and hook latch 1702 may be reduced compared to current mechanical sensing devices.

In the position shown in FIG. 17B, sensor 1706 may sense that target 1718 on rotating portion 1708 is in a position that corresponds to hook latch 1702 in closed position 336. If rotating portion 1708 is in the position shown in FIG. 17B, but unfixed portion 1722 were not in the position shown in FIG. 17B, then sensor 1706 may not be aligned with target 1718, and sensor 1706 may not sense that hook latch 1702 is in closed position 336.

When rotating portion 1708 is in closed position 336, pawl 1712 may transition between engaged position 330, shown in FIG. 17B, and disengaged position 332, shown in FIG. 17A. Engaged position 330 may prevent rotating portion 1708 from moving out of closed position 336. Pawl 1712 may be moved to engaged position 330 by a retraction of lock actuator 1710 pulling pawl lug 1714 left towards fixed portion 306 to the position shown in FIG. 17B.

Figure 18:
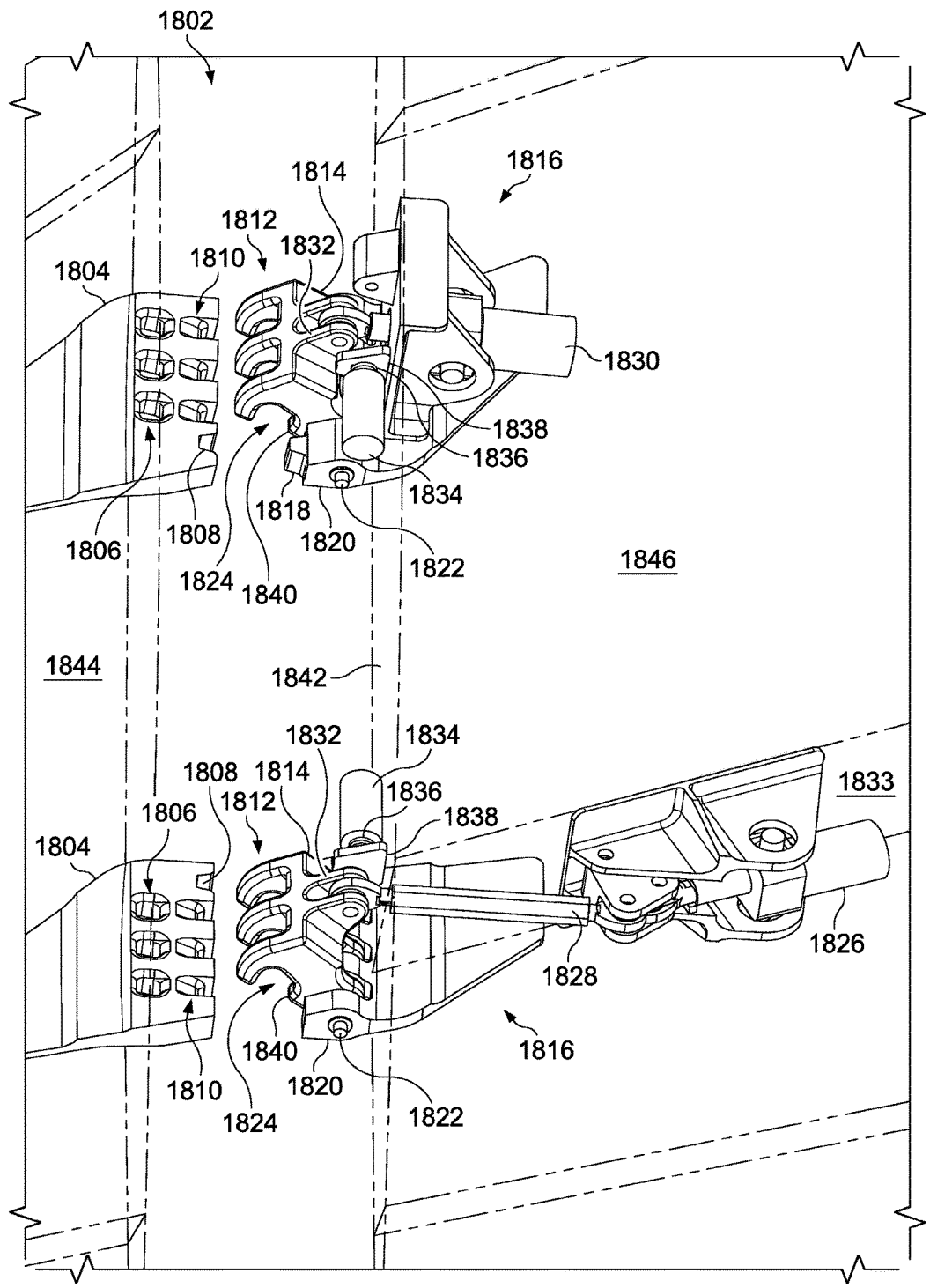
FIG. 18 is a diagram of a wing with a bear claw latch, the wing almost in a flight position, the bear claw latch in an open position, and a lock of the bear claw latch in a disengaged position, in accordance with an illustrative embodiment.
Figure 19:
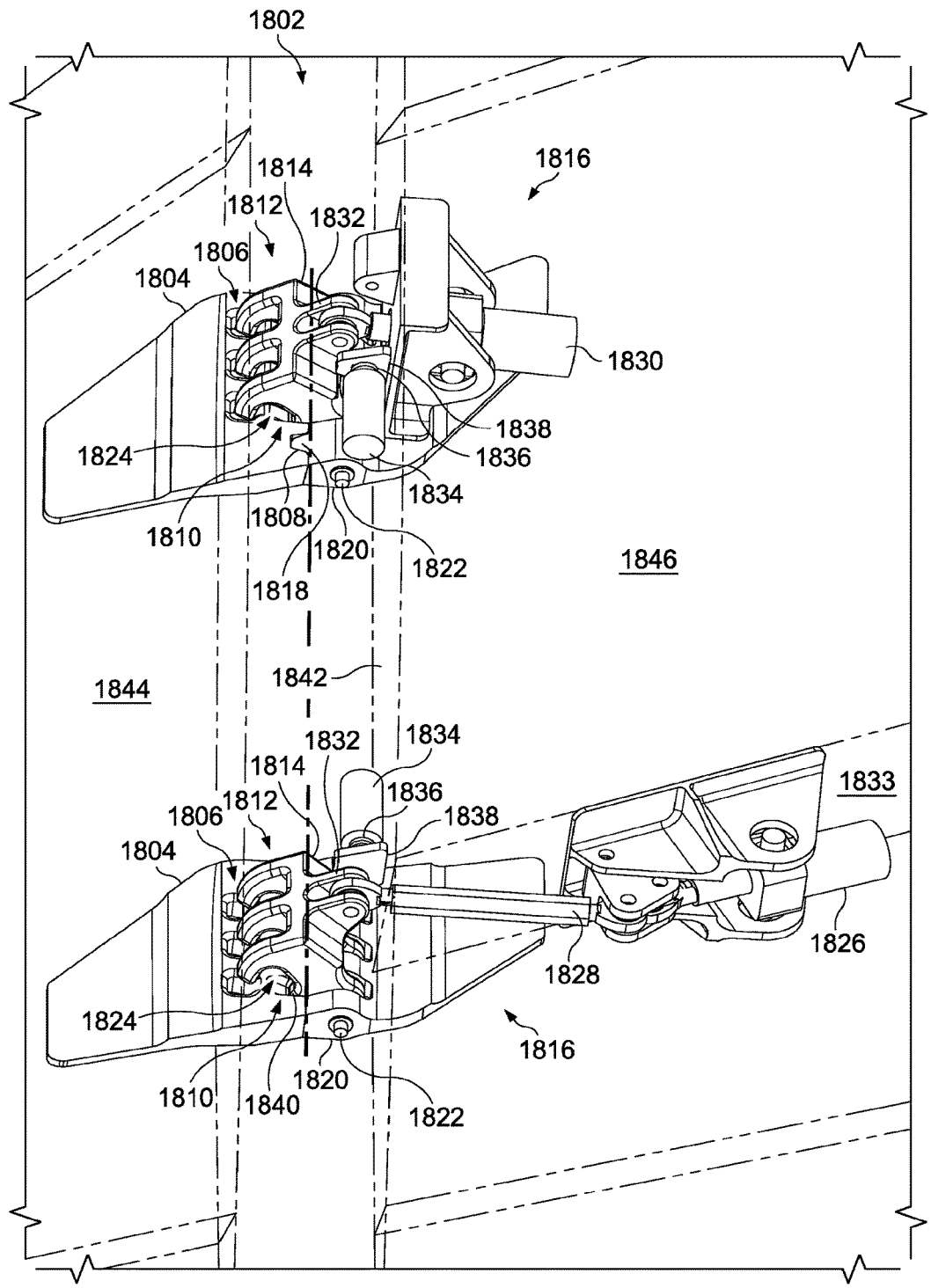
FIG. 19 is a diagram of a wing with a bear claw latch, the wing in a flight position, the bear claw latch in an open position, and a lock of the bear claw latch in a disengaged position, in accordance with an illustrative embodiment.
Figure 20:
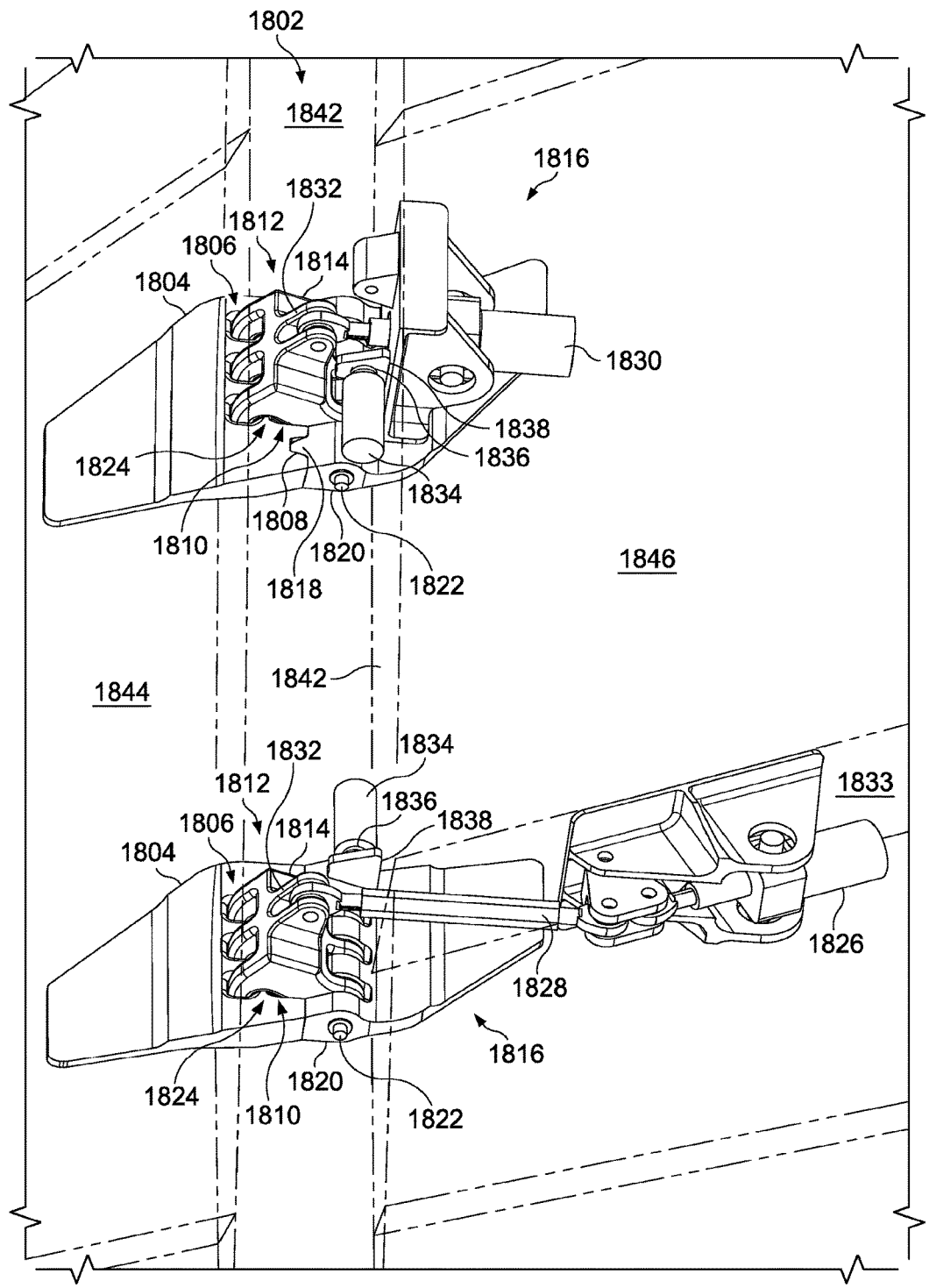
FIG. 20 is a diagram of a wing with a bear claw latch, the wing in a flight position, the bear claw latch in a closed position, and a lock of the bear claw latch in a disengaged position, in accordance with an illustrative embodiment.
Figure 21:
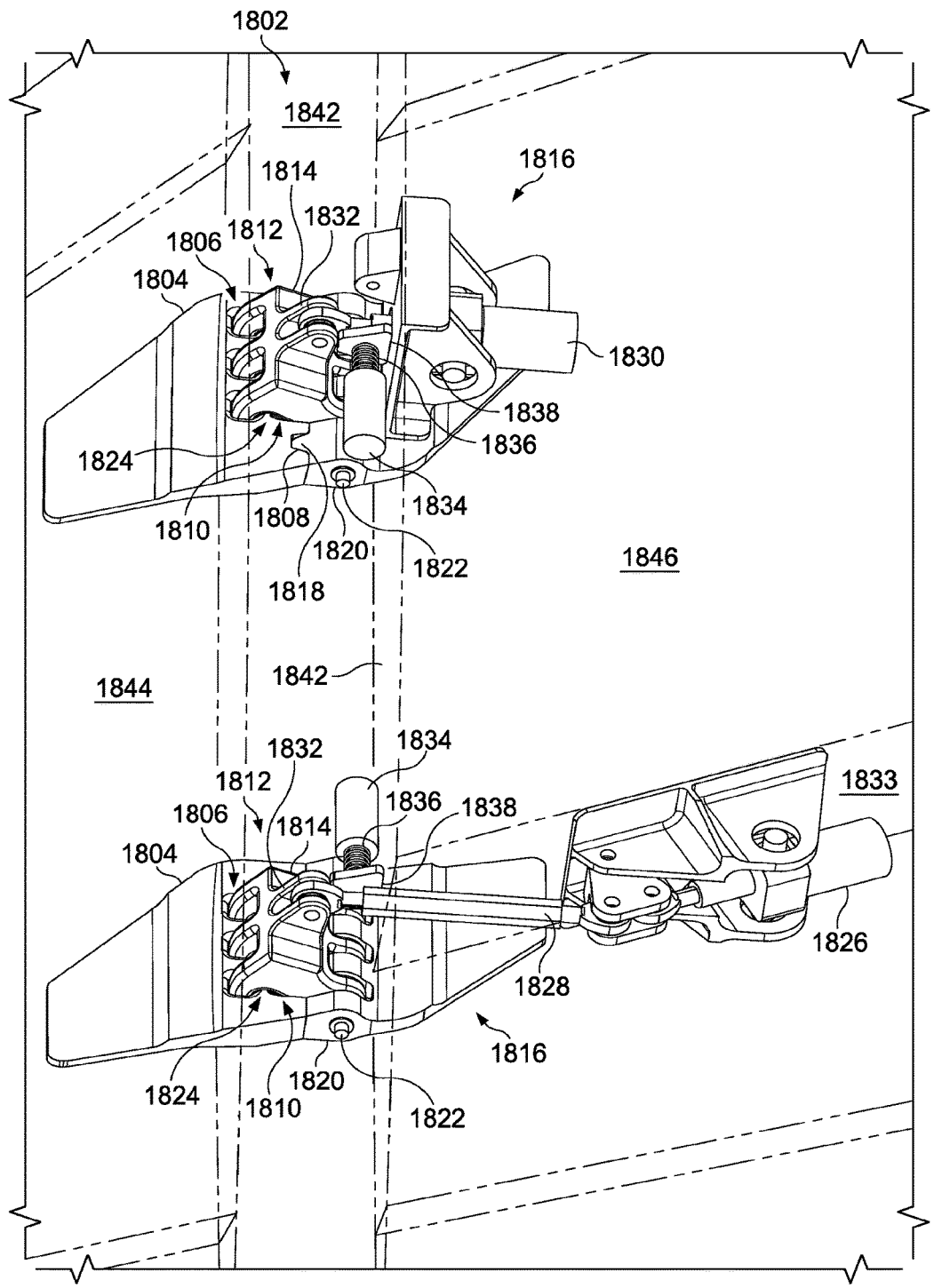
FIG. 21 is a diagram of a wing with a bear claw latch, the wing in a flight position, the bear claw latch in a closed position, and a lock of the bear claw latch in an engaged position, in accordance with an illustrative embodiment.

With reference to FIG. 18 through 21, the figures diagram a wing with a bear claw latch in positions from an open position to a closed position. FIG. 18 is a diagram of a wing with a bear claw latch, the wing almost in a flight position, the bear claw latch in the open position, and a lock of the bear claw latch in a disengaged position, in accordance with an illustrative embodiment; FIG. 19 is a diagram of a wing with a bear claw latch, the wing in a flight position, the bear claw latch in the open position, and a lock of the bear claw latch in the disengaged position, in accordance with an illustrative embodiment; FIG. 20 is a diagram of a wing with a bear claw latch, the wing in a flight position, the bear claw latch in the closed position, and a lock of the bear claw latch in the disengaged position, in accordance with an illustrative embodiment; FIG. 21 is a diagram of a wing with a bear claw latch, the wing in a flight position, the bear claw latch in the closed position, and a lock of the bear claw latch in an engaged position, in accordance with an illustrative embodiment. Because the perspective and components remain the same, although some components may be in different positions, item numbering in FIG. 18 remains the same through FIGS. 19-21.

With reference to FIG. 18, FIG. 18 is a diagram of a wing with a bear claw latch, the wing almost in a flight position, the bear claw latch in an open position, and a lock of the bear claw latch in a disengaged position, in accordance with an illustrative embodiment. Bear claw latch 1802 may be an example of an embodiment of latch assembly 322 of FIG. 3.

Bear claw latch 1802 may include: secured portion 1804, group of openings 1806, nub gap 1808, alignment gaps 1810, group of hooks 1812, securing portion 1814, rotating portion 1816, torsion nub 1818, base 1820, rotation bar 1822, slot 1824, aft claw actuator 1826, link 1828, forward claw actuator 1830, lug 1832, retraction device 1834, spring 1836, lock 1838, and gap lugs 1840. Bear claw latch 1802 may prevent rotation of second portion 1844. Second portion 1844 may be an example of an embodiment of second portion 318 of FIG. 3; of a wing, such as wing 102, wing 104, and wing 300 of FIGS. 1, 2, and 3; and of an aircraft, such as aircraft 100 of FIGS. 1 and 2, with respect to first portion 1846, such as first portion 314 of FIG. 3.

Secured portion 1804 may include group of openings 1806, nub gap 1808, and alignment gaps 1810. Secured portion 1804 may be an example of an embodiment of secured portion 320 of FIG. 3. Secured portion 1804 may be connected to second portion 1844. Second portion 1844 may be an example of an embodiment of unfixed portion 310 of wing 300 of FIG. 3.

Secured portion 1804 may be secured by group of hooks 1812 of securing portion 1814 of rotating portion 1816 when bear claw latch 1802 is in a closed position, such as closed position 336 in FIG. 3. Group of openings 1806 may receive group of hooks 1812 of securing portion 1814 of rotating portion 1816 when rotating portion 1816 transitions between open position 334 and closed position 336.

Nub gap 1808 may engage torsion nub 1818. Engagement of torsion nub 1818 with nub gap 1808 may transfer torsion between secured portion 1804 and base 1820 of rotating portion 1816.

Torsion nub 1818 may also help align group of openings 1806 with group of hooks 1812. Torsion nub 1818 may assist transmission a torsional load, as well as a forward and an aft shear load, between secured portion 1804 of bear claw latch 1802 affixed to second portion 1844 and base 1820 of rotating portion 1816 of bear claw latch 1802 affixed to first portion 1846. First portion 1846 may be an embodiment of fixed portion 306 of FIG. 3. Torsion nub 1818 may reduce an amount of torsion and an amount of stress between group of openings 1806 and group of hooks 1812.

Rotating portion 1816 may be an embodiment of rotating portion 316 of FIG. 3. Rotating portion 1816 may include group of hooks 1812, securing portion 1814, torsion nub 1818, base 1820, rotation bar 1822, slot 1824, aft claw actuator 1826, link 1828, forward claw actuator 1830, lug 1832, retraction device 1834, spring 1836, lock 1838, and gap lugs 1840.

Rotating portion 1816 may rotate between open position 334 as shown in FIG. 18, and closed position 336 as shown in FIG. 18. Rotating portion 1816 may be rotated about rotation bar 1822 by its respective claw actuator. Rotating portion 1816 may engage group of hooks 1812 of securing portion 1814 with group of openings 1806 of secured portion 1804.

Lug 1832 on securing portion 1814 may connect to aft claw actuator 1826 via link 1828. Aft claw actuator 1826 may be attached to aft spar 1833 of wing box 308. Aft claw actuator 1826 may be attached to aft spar 1833 of wing box 308 in an aft trunnion mounting. A rotation axis of the aft trunnion mounting for the aft claw actuator may be substantially vertical. Thus, a central axis of aft claw actuator may not be directly aligned with an axis of motion for lug 1832 on securing portion 1814.

Forward claw actuator 1830 may be connected to rib 1842. Forward claw actuator 1830 may be mounted in a forward trunnion. A rotation axis for the forward trunnion may be substantially horizontal. Rib 1842 may form an outside edge of wing box 308. Rib 1842 may be reinforce to support forward claw actuator 1830 or forces generated by forward claw actuator 1830. Forward claw actuator 1830 may connect directly to lug 1832. A central axis of forward claw actuator 1830 may be directly aligned with an axis of motion for lug 1832 on securing portion 1814 of rotating portion 1816.

Each claw actuator may be powered hydraulically, electrically, by other appropriate methods, or by any combination thereof. Each claw actuator may have a different power source from another claw actuator.

Group of hooks 1812 may be formed as a single piece. Group of hooks 1812 may include a greater or lesser number of hooks than are represented in FIG. 18I through FIG. 18. Group of openings 1806 may have a number of openings that are at least equal to a number of hooks in group of hooks 1812.

Securing portion 1814 may be an embodiment of securing portion 328 of FIG. 3. Securing portion 1814 may secure secured portion 1804 of bear claw latch 1802 when rotating portion 1816 is in closed position 336.

Locks 1838 may include a linear retraction device that, when rotating portion 1816 is in a closed position, may transition locks 1838 between an engaged position and a disengaged position. The engaged position may prevent rotating portion 1816 from leaving the closed position.

With reference now to FIG. 19, FIG. 19 is a diagram of a wing with a bear claw latch, the wing in a flight position, the bear claw latch in the open position, and a lock of the bear claw latch in the disengaged position, in accordance with an illustrative embodiment. Second portion 1844 and first portion 1846 may be closer together in FIG. 19 than they were in FIG. 18.

When wing 300 is in flight position 302, torsion nub 1818 may engage with nub gap 1808. Gap lugs 1840 may align and engage with alignment gaps 1810. When gap lugs 1840 align and engage with alignment gaps 1810, then rotating portion 1816 may be rotated by claw actuators to engage with secured portion 1804 on second portion 1844.

Rotating portion 1816 may receive secured portion 1804 into slot 1824 when rotating portion 1816 transitions from open position 334 to closed position 336. Securing portion 1814 may include group of hooks 1812. Group of hooks 1812 may engage group of openings 1806 in secured portion 1804 as securing portion 1814 moves from open position 334 to closed position 336. In FIG. 18, where securing portion 1814 has not fully moved to closed position 336, secured portion 1804 may not be fully engaged with slot 1824, and group of hooks 1812, may not be fully inserted into group of openings 1806.

Lock 1838 is shown in disengaged position 332. Lock may be considered in disengaged position 332 because lock 1838 may not be positioned between lug 1832 and rib 1842. Lock 1838 may have spring 1836 disposed to push lock 1838 into engaged position 330. Lock 1838 may have retraction device 1834 energized to counteract push of spring 1836 and hold lock 1838 retracted from a position between lug 1832 and rib 1842.

Referring now to FIG. 20, FIG. 20 is a diagram of a wing with a bear claw latch, the wing in a flight position, the bear claw latch in the closed position, and a lock of the bear claw latch in the disengaged position, in accordance with an illustrative embodiment. In closed position 336, secured portion 1804 may be fully engaged with slot 1824, and group of hooks 1812, may be fully inserted into group of openings 1806.

As shown in FIG. 20, wing 300 is in flight position 302, and bear claw latch 1802 is in flight position 302 with wingtip 312 fully extended with wingspan 132 as shown for aircraft 100 in FIG. 1. As shown in FIG. 20, wing 300 should be capable of sustaining flight loads, and wing 300 ready for flight. Lock 1838 may provide a redundant feature to prevent bear claw latch 1802 from moving out of closed position 336.

Referring now to FIG. 21, FIG. 21 is a diagram of a wing with a bear claw latch, the wing in a flight position, the bear claw latch in the closed position, and a lock of the bear claw latch in an engaged position, in accordance with an illustrative embodiment. With lock 1838 in engaged position 330, spring 1836 may extend and push lock 1838 in between lug 1832 and rib 1842.

Spring 1836 provides a mechanism that may hold lock 1838 in engaged position 330 as long as retraction device 1834 is not powered and activated to retract lock 1838.

Neither claw actuator may have enough force to overcome a blocking effect of a first side of lock 1838 contacting lug 1832 and a second side of lock 1838 contacting rib 1842.

Lock 1838 being in engaged position 330 may not allow either claw actuator to pull lug 1832 away from secured portion 1804. Retraction device 1834 may have to be energized, and overpower spring 1836, to retract lock 1838 from engaged position 330, before either claw actuator may be activated to retract rotating portion 1816 from closed position 336 to open position 334.

Figure 22:
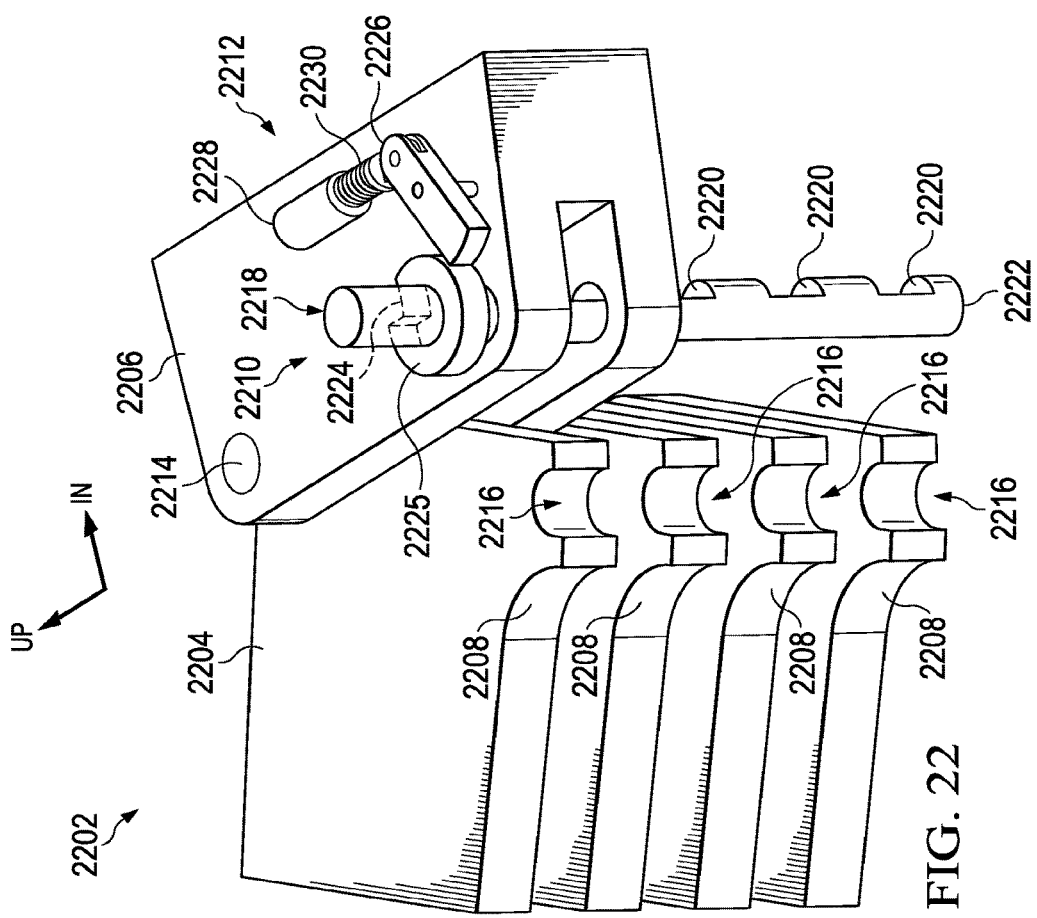
FIG. 22 is a diagram of a perspective upward looking view of a cam latch in an open position, and a lock of the cam latch in a disengaged position, in accordance with an illustrative embodiment.
Figure 23:
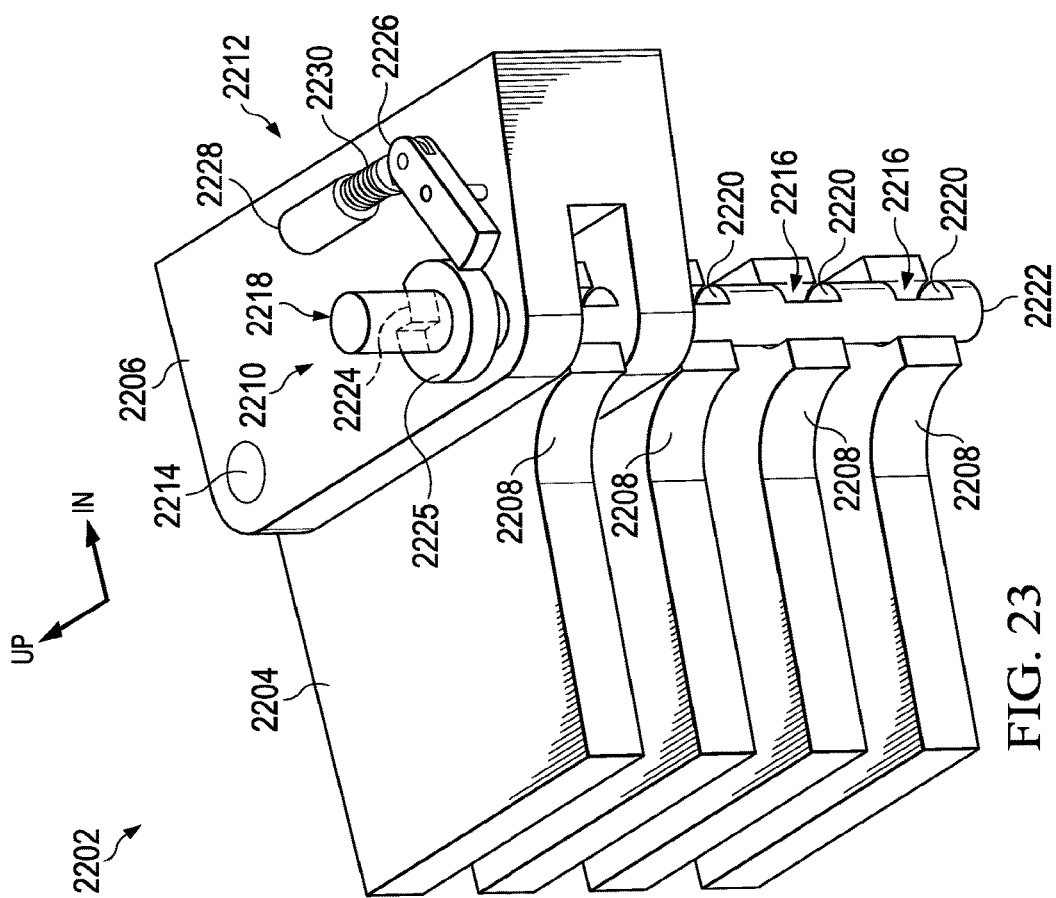
FIG. 23 is a perspective upward looking view diagram of a cam latch in an open position for a wing in a flight position, and a lock of the cam latch in a disengaged position, in accordance with an illustrative embodiment.
Figure 24:
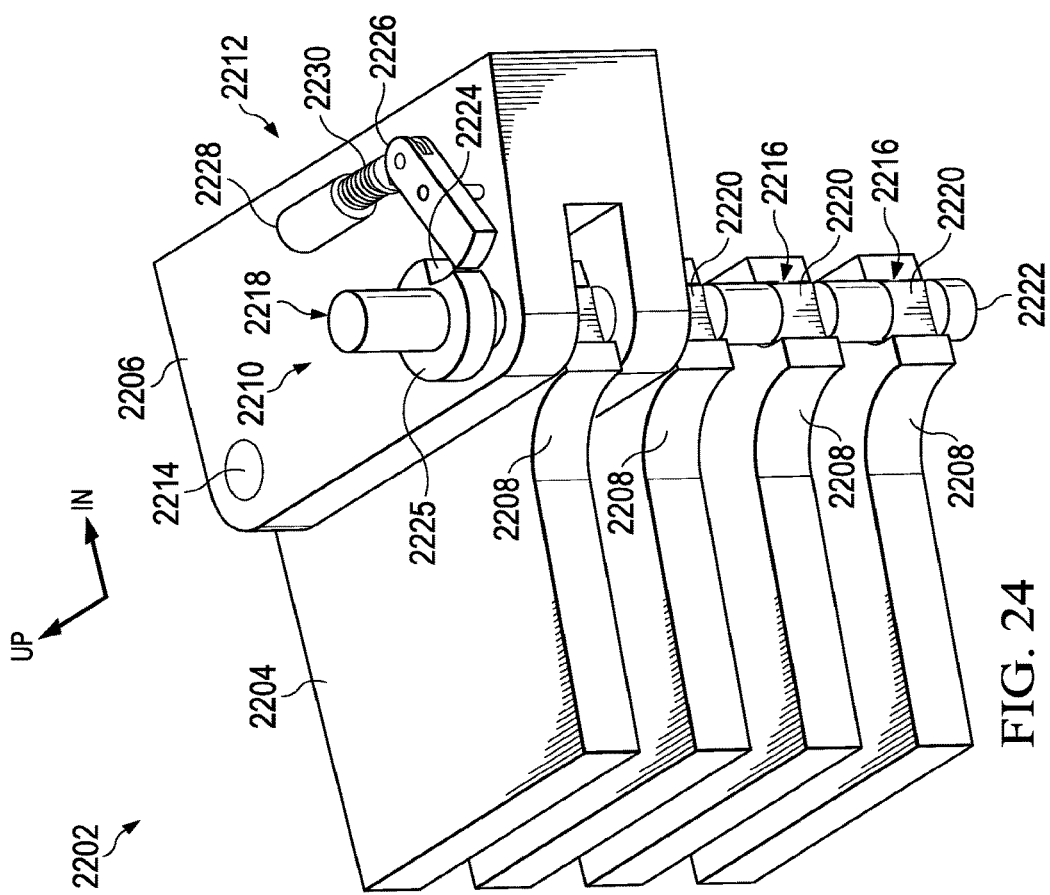
FIG. 24 is a perspective upward looking view diagram a cam latch in a closed position for a wing in a flight position, and a lock of the cam latch in a disengaged position, in accordance with an illustrative embodiment.
Figure 25:
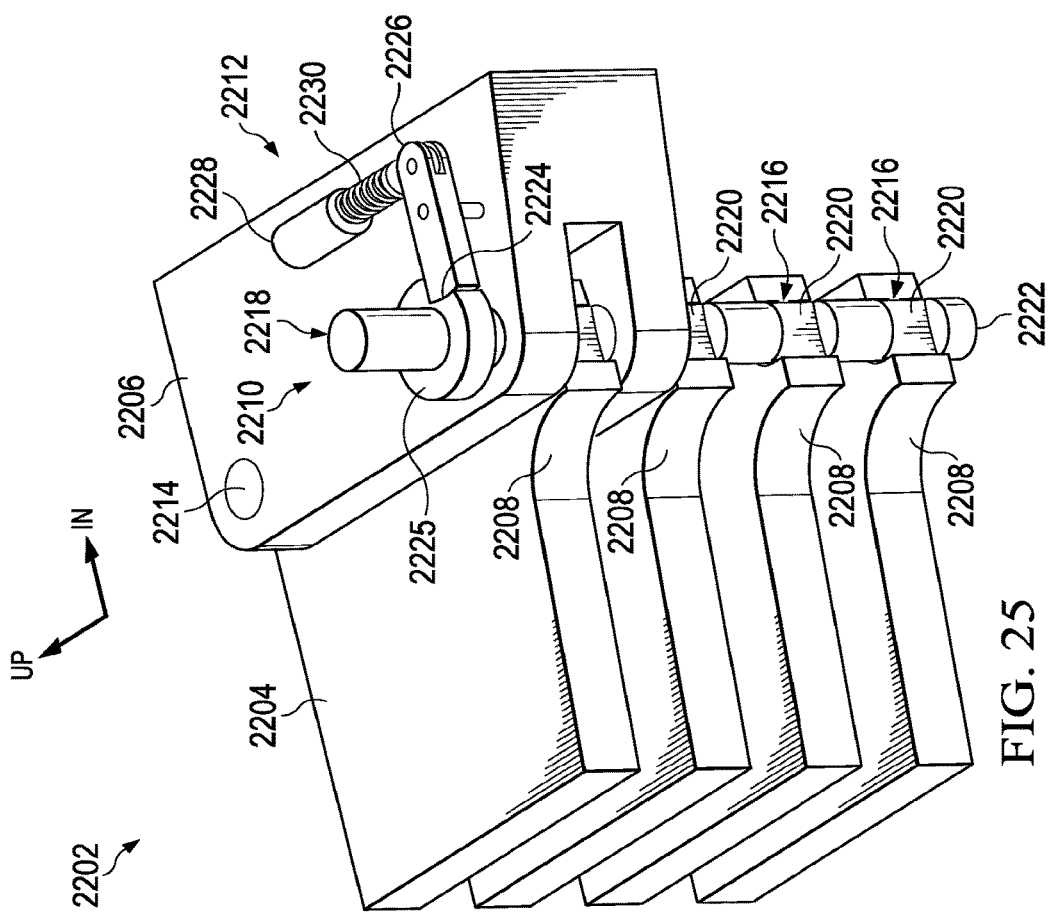
FIG. 25 is a perspective upward looking view diagram a cam latch in a closed position for a wing in a flight position, and a lock of the cam latch in an engaged position, in accordance with an illustrative embodiment.

With reference now to FIGS. 22-25, FIGS. 22-25 are diagrams of a perspective upward looking view of a cam latch. FIG. 22 is a diagram of a perspective upward looking view of a cam latch in an open position, and a lock of the cam latch in a disengaged position, in accordance with an illustrative embodiment; FIG. 23 is a perspective upward looking view diagram of a cam latch in an open position for a wing in a flight position, and a lock of the cam latch in a disengaged position, in accordance with an illustrative embodiment; FIG. 24 is a perspective upward looking view diagram a cam latch in a closed position for a wing in a flight position, and a lock of the cam latch in a disengaged position, in accordance with an illustrative embodiment; and FIG. 25 is a perspective upward looking view diagram a cam latch in a closed position for a wing in a flight position, and a lock of the cam latch in an engaged position, in accordance with an illustrative embodiment. Accordingly, because the perspective and components remain unchanged, although some component positions may change, item numbers marked in FIG. 22 will be carried through FIGS. 23-25.

With reference now to FIG. 22, FIG. 22 is a diagram of a perspective upward looking view of a cam latch in an open position, and a lock of the cam latch in a disengaged position, in accordance with an illustrative embodiment. More specifically, FIG. 22 cam latch 2202 is shown in open position 334, with wing 300 close to, but not in, flight position 302, and cam latch 2202 configured to latch unfixed portion 2204 to fixed portion 2206 of wing 300, as shown in FIG. 3.

Cam latch 2202 may include: secured portion 2208, rotating portion 2210, and lock 2212. Cam latch 2202 may be an embodiment of latch assembly 322 of FIG. 3. Cam latch 2202 may prevent rotation of unfixed portion 2204 about fold axis 2214.

Although FIG. 22 shows unfixed portion 2204 comprised of four similar sections, being received by one section of fixed portion 2206, it is understood that unfixed portion 2204 may comprise more or less than four sections, and that fixed portion 2206 may comprise a number of sections from one up to the number of sections of the unfixed portion 2204. Optimizing the strength of each section versus the number of sections used may allow the cam latch design to occupy less space, and use less material and/or weight than current latch designs for wing folding systems.

Secured portion 2208 may include group of openings 2216. Each opening in group of openings 2216 may be a semicircular shape. Secured portion 2208 may be connected to unfixed portion 2204 of wing 300 of FIG. 3, which may be second portion 318 of FIG. 3; of a wing, such as wing 102, wing 104, and wing 300 of FIGS. 1, 2, and 3, with respect to rotating portion 2210. Rotating portion 2210 may include: cam 2218. Cam 2218 may include slot 2220, securing portion 2222, notch 2224, and collar 2225. Rotating portion 2210 may be an embodiment of rotating portion 316 of FIG. 3. Rotating portion 2210 may connect to fixed portion 2206, which may be first portion 314 of FIG. 3; of a wing, such as wing 102, wing 104, and wing 300 of FIGS.

1, 2, and 3. Rotating portion 2210 may rotate between open position 334 and closed position 336.

Cam 2218 may be a cylindrical shape with slot 2220 indentations. Thus, securing portion 2222 may be substantially a solid hemisphere of the cam. Cam may have a notch in collar 2225. Collar 2225 may be connected onto, or integrally molded with cam 2218, such that cam 2218 and collar 2225 may rotate together. Securing portion 2222 of cam 2218 may secure secured portion 2208 when rotating portion 2210 is in closed position 336. Slot 2220 of cam 2218 may receive secured portion 2208 when rotating portion 2210 is in open position 334.

Securing portion 2222 may have a circular circumference. A diameter of the semicircular shape of each opening in group of openings 2216 may be sized to engage the circular circumference of securing portion 2222 of cam 2218. Slot 2220 may be an indentation that may be a removal of substantially a hemisphere, for a distance along a length of cam 2218, from the cylindrical shape of cam 2218.

Lock 2212 may include arm 2226, retraction device 2228, and spring 2230. Lock 2212 may be a size and a shape to engage notch 2224 in collar 2225 of rotating portion 2210. Spring 2230 may connect to and bias arm 2226 to contact rotating portion 2210 and to engage notch 2224. Retraction device 2228 may be enabled to retract spring 2230 and retract arm 2226 out of notch 2224.

With reference now to FIG. 23, FIG. 23 is a perspective upward looking view diagram of a cam latch in an open position for a wing in a flight position, and a lock of the cam latch in a disengaged position, in accordance with an illustrative embodiment. More specifically, FIG. 23 shows unfixed portion 2204 after rotating about fold axis 2214 into fixed portion 2206 such that unfixed portion 2204 and fixed portion 2206 may be aligned in flight position 302 of FIG. 3.

In order for secured portion 2208 to move from a position of secured portion 2208 as shown in FIG. 22 to a position of secured portion 2208 as shown in FIG. 23, unfixed portion 2204, including secured portion 2208, and fixed portion 2206, including rotating portion 2210 may be sized so that a side of secured portion 2208 that is closest to fixed portion 2206, may be shorter, measured from fold axis 2214 than a distance from fold axis 2214 to a planar surface of slot 2220, when the planar surface of slot 2220 is orthogonal to a line from a center of fold axis 2214 to a center of cam 2218.

Thus, for a position shown for unfixed portion 2204 in FIG. 22 to move to a position for unfixed portion 2204 as shown in FIG. 23, rotating portion 2210 may need to be rotated such that each slot 2220 in cam 2218 of rotating portion 2210 may be positioned to allow the side of secured portion 2208 that is closest to fixed portion 2206 to pass through each slot 2220 such that cam 2218 centers over group of openings 2216.

Rotating portion 2210 may be rotated by a cam actuator (not shown). The cam actuator may connect to cam 2218. The cam actuator may be an example of an embodiment of latch actuator 342 of FIG. 3.

Group of openings 2216 may be received by each slot 2220 of cam 2218 when rotating portion 2210 is in open position 334. Group of openings 2216 of secured portion 2208 may be secured by securing portion 2222 of rotating portion 2210 when rotating portion 2210 is in closed position 336, as in FIG. 3.

With reference to FIG. 24, FIG. 24 is a perspective upward looking view diagram a cam latch in a closed position for a wing in a flight position, and a lock of the cam latch in a disengaged position, in accordance with an illustrative embodiment. More specifically, cam latch 2202 is shown with rotating portion 2210 in closed position 336 for wing 300 in flight position 302, with arm 2226 of lock 2212 in disengaged position 332, as shown in FIG. 3.

Lock 2212 may be in disengaged position 332 when arm 2226 is not engaged with notch 2224. Cam 2218 may rotate when lock 2212 is in disengaged position 332. With lock 2212 in disengaged position 332, cam actuator may rotate cam 2218 180 degrees from a position of cam 2218 as shown in FIG. 24. If cam 2218 were rotated 180 degrees from the position of cam 2218 as shown in FIG. 24, then unfixed portion 2204 could move away from fixed portion 2206 to be in a position of unfixed portion 2204 as shown in FIG. 22.

However, even with lock disengaged, when rotating portion 2210 remains in a position of rotating portion 2210 as shown in FIG. 24, secured portion 2208 and unfixed portion 2204 may be secured to rotating portion 2210 and fixed portion 2206.

With reference to FIG. 25, FIG. 25 is a perspective upward looking view diagram a cam latch in a closed position for a wing in a flight position, and a lock of the cam latch in an engaged position, in accordance with an illustrative embodiment. More specifically, cam latch 2202 is shown with rotating portion 2210 in closed position 336 for wing 300 in flight position 302, with arm 2226 of lock 2212 in engaged position 330.

Lock 2212 may include: arm 2226, retraction device 2228 and spring 2230. Arm 2226 may rotate about a pivot point. Spring 2230 may exert a force on arm 2226 to move arm 2226 into notch 2224 when arm 2226 may align with notch 2224. Retraction device may energize to retract spring 2230, counteract the force of spring 2230 on arm 2226, and thus move arm 2226 out of notch 2224.

Rotating portion 2210 may not rotate with lock 2212 in engaged position 330. Lock 2212 may be in engaged position when arm 2226 engages notch 2224. Secured portion 2208 may not move away from rotating portion 2210 until retraction device 2228 may activate, counteract the force of spring 2230 on arm 2226, and move arm 2226 to withdraw from notch 2224.

Figure 26:
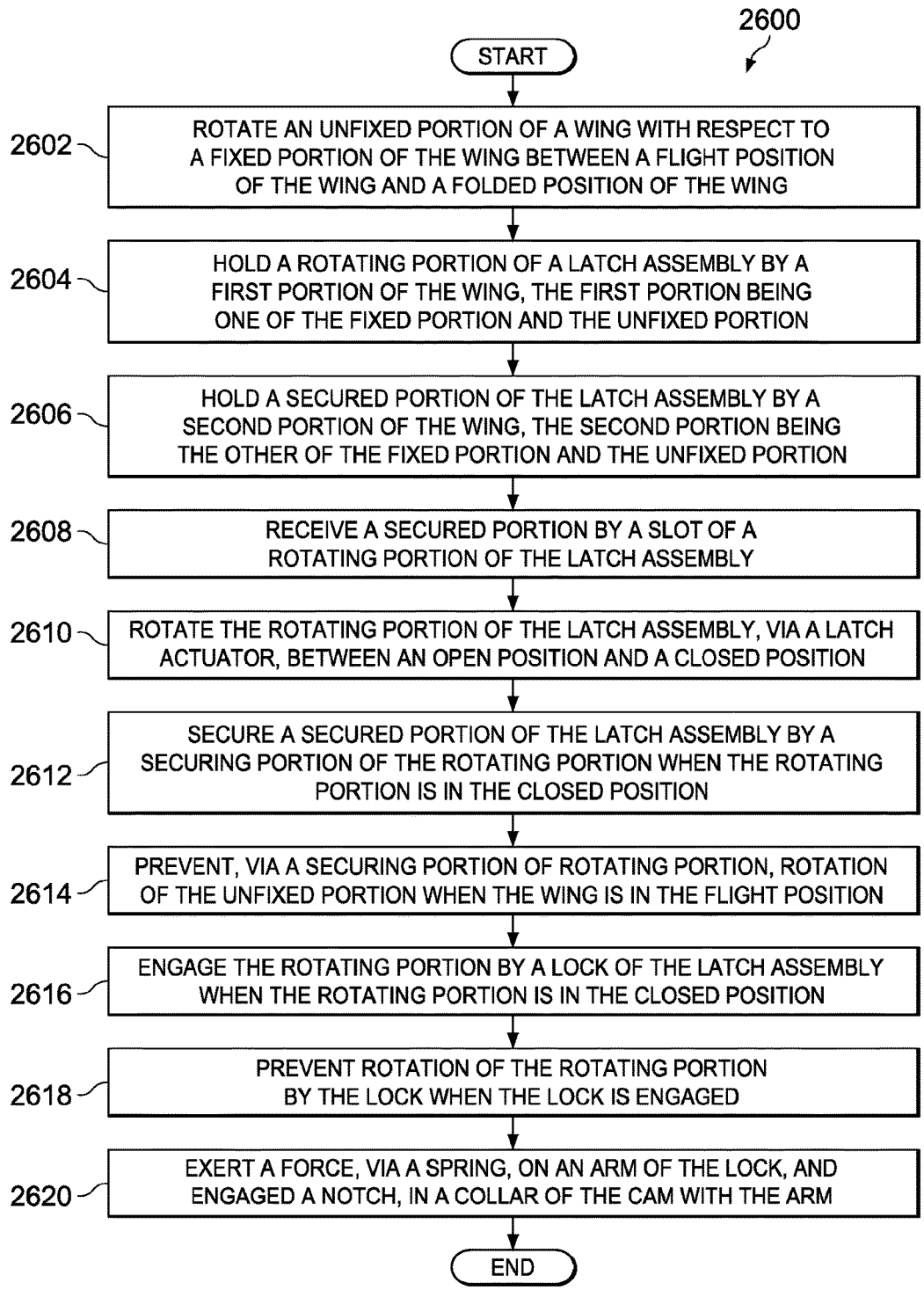
FIG. 26 is a diagram of operations for a method of folding and unfolding a wing, depicted in accordance with an illustrative embodiment.

With reference to FIG. 26, FIG. 26 is a diagram of operations for a method of folding and unfolding a wing, depicted in accordance with an illustrative embodiment; FIG. 26 shows operation 2602 through operation 2620;

Method 2600 illustrated in FIG. 26 may be implemented in a wing, such as wing 102, wing 104, and wing 300 in FIGS. 1, 2, and 3.

Method 2600 may include operations listed below. Method 2600 may start with operation 2602 and end after operation 2620. Operations listed for method 2600 may be performed in an order other than that presented. Some operations may be performed simultaneously. Some operations may be omitted. Operations other than those listed may be added. Performance of some operations, or ordering of operations, may be dependent upon a beginning state of the wing, such as a flight position or a folded position, or being in transition between states.

Method 2600 may include rotating an unfixed portion of a wing may with respect to a fixed portion of the wing between a flight position of the wing and a folded position of the wing (operation 2602). The rotation may be performed by an actuator. Rotating the unfixed portion may allow for a longer wingspan in the flight position than in the folded position. Rotating the unfixed portion may allow for improved aerodynamic performance of the wing in the flight position and may allow for use of the aircraft at airports that may require a smaller wingspan when in the folded position.

Method 2600 may include holding a rotating portion of a latch assembly by a first portion of the wing, the first portion may be one of the fixed portion and the unfixed portion (operation 2604). The unfixed portion may include a wingtip and the fixed portion may include a wing box. Holding the rotating portion of the latch assembly may allow the latch assembly to secure the unfixed portion of the wing to the fixed portion of the wing when in the flight position. The latch assembly may be a cam latch. Holding the rotating portion may include the rotating portion being: connected to the fixed portion of the wing, and being configured as a cam. The cam may be: substantially cylindrically shaped and may include a slot.

Method 2600 may include holding a secured portion of the latch assembly by a second portion of the wing, the second portion may be the other of the fixed portion and the unfixed portion (operation 2606). Holding the secured portion of the latch assembly may allow the latch assembly to secure the unfixed portion of the wing to the fixed portion of the wing when in the flight position. Holding the secured portion may include the secured portion including a group of openings. The group of openings may be semicircular shaped with a first diameter that is larger than a second diameter of a securing portion of the cam.

Method 2600 may include receiving a secured portion of the wing by a slot of a rotating portion of the latch assembly (operation 2608). Receiving the secured portion of the wing by the rotating portion may allow the rotating portion to transition from the open position to a closed position. Receiving a secured portion may include passing a side of the secured portion from outside one point on a perimeter of the cam through the slot in the cam to outside an opposing point on the perimeter of the cam, the side being nearest the fixed portion, and the slot being a substantially hemispherical indentation in the cam configured to allow the side to pass through the slot.

Method 2600 may include rotating the rotating portion of the latch assembly, via a latch actuator, between the open position and a closed position (operation 2610). Rotating the rotating portion between the open position and the closed position may allow the rotating portion to secure the secured portion.

Method 2600 may include securing a secured portion of the latch assembly by a securing portion of the rotating portion when the rotating portion may be in the closed position (operation 2612). Securing the secured portion of the latch assembly by a securing portion of the rotating portion may prevent movement of an unfixed portion of a wing with respect to a fixed portion of the wing. The securing portion of the rotating portion may be the securing portion of the cam.

Method 2600 may include preventing, via a securing portion of the rotating portion, rotation of the unfixed portion when the wing is in the flight position (operation 2614). The securing portion of the rotating portion may be substantially a hemisphere of the cam, the hemisphere being without a slot.

Method 2600 may include engaging the rotating portion by a lock of the latch assembly when the rotating portion is in the closed position (operation 2616). The lock may allow the rotating portion to transition from the open position to the closed position when the lock may be in a disengaged position.

Method 2600 may include preventing rotation of the rotating portion by the lock when the lock is engaged (operation 2618). Preventing rotation of the rotating portion by the lock may ensure that the latch assembly may remain in the closed position when the wing may be in the flight position.

Method 2600 may include exerting a force, via a spring, on an arm of the lock to engage a notch in a collar of the cam with the arm (operation 2620).

Figure 27:
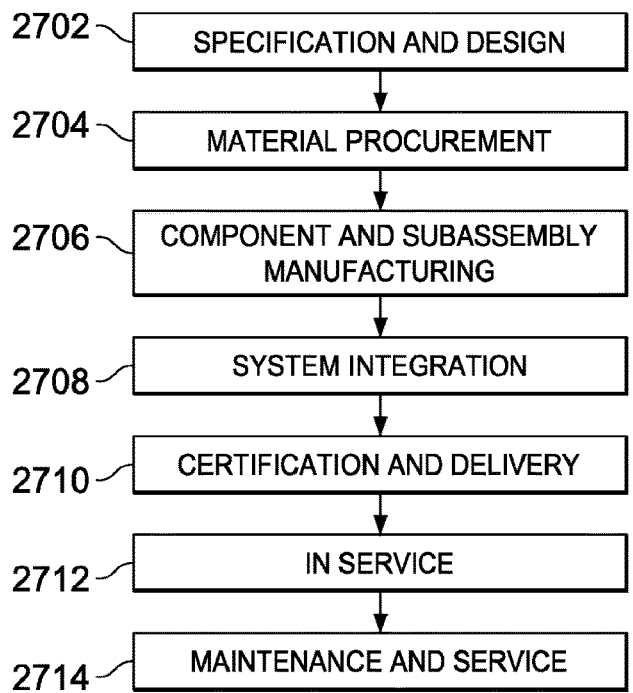
FIG. 27 is an illustration of an aircraft manufacturing and service method is depicted in accordance with an illustrative embodiment.
Figure 28:
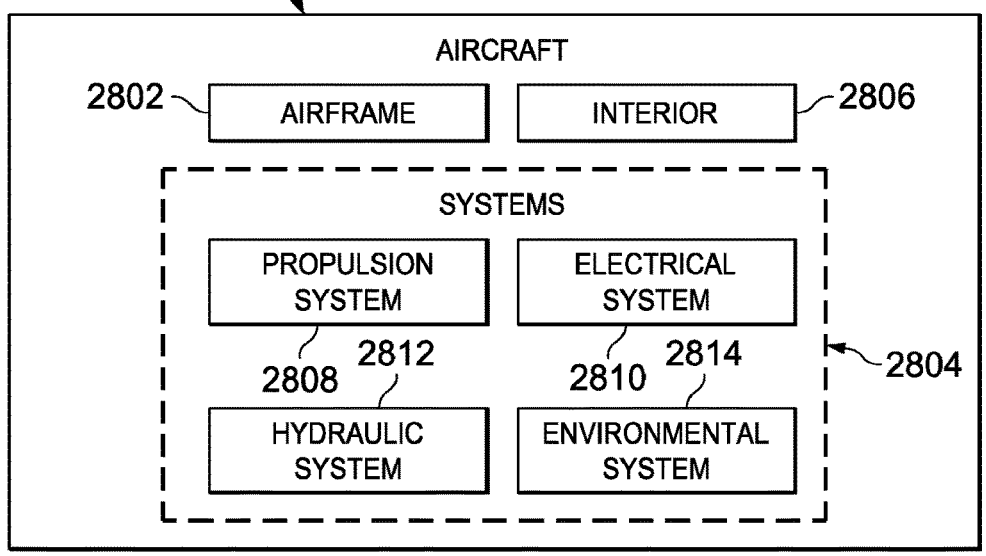
FIG. 28 is an illustration of an aircraft is depicted in which an illustrative embodiment may be implemented.

Illustrative embodiments of the disclosure may be described in the context of aircraft manufacturing and service method 2700 as shown in FIG. 27 and aircraft 2800 as shown in FIG. 28. Turning first to FIG. 27, an illustration of an aircraft manufacturing and service method is depicted in accordance with an illustrative embodiment. During preproduction, aircraft manufacturing and service method 2700 may include specification and design 2702 of aircraft 2800 in FIG. 28 and material procurement 2704.

During production, component and subassembly manufacturing 2706 and system integration 2708 of aircraft 2800 in FIG. 28 takes place. Thereafter, aircraft 2800 in FIG. 28 may go through certification and delivery 2710 in order to be placed in service 2712. While in service 2712 by a customer, aircraft 2800 in FIG. 28 is scheduled for routine maintenance and service 2714, which may include modification, reconfiguration, refurbishment, and other maintenance or service.

Each of the processes of aircraft manufacturing and service method 2700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 28, an illustration of an aircraft is depicted in which an illustrative embodiment may be implemented. In this example, aircraft 2800 is produced by aircraft manufacturing and service method 2700 in FIG. 27 and may include airframe 2802 with plurality of systems 2804 and interior 2806. Examples of systems 2804 include one or more of propulsion system 2808, electrical system 2810, hydraulic system 2812, and environmental system 2814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2700 in FIG. 27.

In one illustrative example, components or subassemblies produced in component and subassembly manufacturing 2706 in FIG. 27 may be fabricated or manufactured in a manner similar to components or subassemblies produced while aircraft 2800 is in service 2712 in FIG. 27. As yet another example, one or more apparatus embodiments, method embodiments, or a combination thereof may be utilized during production stages, such as component and subassembly manufacturing 2706 and system integration 2708 in FIG. 27. One or more apparatus embodiments, method embodiments, or a combination thereof may be utilized while aircraft 2800 is in service 2712 and/or during maintenance and service 2714 in FIG. 27. The use of a number of the different illustrative embodiments may substantially expedite the assembly of and/or reduce the cost of aircraft 2800.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of folding and unfolding a wing, the method comprising:
   rotating an unfixed portion of the wing with respect to a fixed portion of the wing between a flight position of the wing and a folded position of the wing;
   controlling, via a rotating portion of a latch assembly on the fixed portion of the wing, connecting the unfixed portion to the fixed portion;
   securing, a secured portion, comprising a T-shaped end, of the latch assembly in a securing portion of the unfixed portion of the wing;
   receiving the secured portion by a slot in a barrel of the latch assembly; and
   rotating, between an open position of the latch assembly and a closed position of the latch assembly, the rotating portion of the latch assembly, via moving the barrel, between an open position and a closed position wherein securing the secured portion of the latch assembly by the securing portion of the rotating portion further comprises an end of the barrel comprising a notch engaging an arm.

2. The method of claim 1, further comprising:
   securing the secured portion of the latch assembly by a securing portion of the rotating portion via moving the rotating portion to the closed position; and
   preventing, via the securing portion of the rotating portion, rotation of the unfixed portion when the wing is in the flight position.

3. The method of claim 1, further comprising:
   engaging the rotating portion by a lock of the latch assembly after moving the rotating portion to the closed position; and
   preventing rotation of the rotating portion by engaging the lock.

4. The method of claim 1, wherein the fixed portion comprises a wing box of the wing and the unfixed portion comprises a wingtip of the wing.

5. The method of claim 1, further comprising configuring the latch assembly as a barrel latch.

6. The method of claim 1, further comprising:
   the rotating portion:
      connecting to an outer lug on the fixed portion of the wing: and
      being configured as the barrel; and
   the secured portion comprising an inner lug connecting to the unfixed portion.

7. The method of claim 6, further comprising the barrel being substantially cylindrically shaped.

8. The method of claim 1, further comprising the fixed portion of the wing comprising a latch actuator connecting to an outer lug retaining the barrel.

9. The method of claim 1, further comprising the arm connecting to a rod connecting to a lock actuator.

10. The method of claim 9, further comprising: exerting a force, via the lock actuator, on the arm, acting as a lock, and engaging the notch with the arm.

11. An apparatus comprising:
    a fixed portion of a wing;
    the unfixed portion of the wing configured to rotate between a folded position of the wing and a flight position of the wing;
    the fixed portion of the wing configured to hold a rotating portion of a latch assembly of the wing; and
    the unfixed portion of the wing configured to hold a secured portion of the latch assembly of the wing, the latch assembly configured to prevent rotation of the unfixed portion of the wing with the wing in the flight position, the latch assembly comprising the rotating portion:
    configured to rotate between: an open position, and a closed position;
    being a barrel that extends through an outer lug connecting to the unfixed portion of the wing; and
    comprising :
       a slot configured to receive the secured portion of the latch assembly,
       a securing portion configured to secure the secured portion of the latch assembly with the latch assembly in the closed position
       the slot comprising a first diameter width that is larger than a second width of the slot in the securing portion of the barrel, such that the secured portion fits, with the latch assembly in the open position, into the barrel through the first width; and
       the second width of the slot comprising a size configured to stop a rotation of the barrel at the closed position of the latch assembly via a contact with a side of the secured portion.

12. The apparatus of claim 11, the latch assembly further comprising a lock configured to:
    engage the rotating portion when the rotating portion is in the closed position; and
    prevent rotation of the rotating portion when the lock is in an engaged position.

13. The apparatus of claim 11, wherein the fixed portion comprises a wing box of the wing and the unfixed portion comprises a wingtip of the wing.

14. The apparatus of claim 11, wherein the secured portion comprises a T-shaped end, the slot of the rotating portion being configured to allow the T-shaped end to fit into the rotating portion with the rotating portion in the open position, and the securing portion of the rotating portion configured to secure the secured portion by the rotating portion with the rotating portion in the closed position.

15. The apparatus of claim 14, further comprising the barrel being substantially cylindrically shaped and comprising the slot, and the securing portion, formed thereby, of the rotating portion.

16. A system for improving a fuel efficiency of an aircraft, the system comprising:
- a first wingspan of the aircraft configured to expand beyond a length allowed for ground operation of the aircraft at an airport; and
- a wing fold system, located within a wing such that the wing fold system comprises a latch assembly of a size that precludes a need to add any thickness and any fairing to a shape of the wing, the wing fold system configured to reduce the first wingspan of the aircraft to a second wingspan of the aircraft, the second wingspan being within the length allowed, such the latch assembly comprises a rotating portion that comprises a barrel that comprises a slot, connected to a fixed portion of the wing and configured to secure a T-shaped secured portion connected to an unfixed portion of the wing and an end that comprises a notch configured to engage an arm.

17. The system of claim 16 further comprising the wing fold system configured to preclude a change, due to the latch assembly within the wing of the wing fold system, of a cross-sectional outline of the wing, such that the wing fold system comprises a secured portion configured to engage the rotating portion that comprises the slot and a securing portion.

* * * * *

UNITED STATES PATENT AND TRADEMARK OFFICE
CERTIFICATE OF CORRECTION

PATENT NO. : 10,370,083 B2
APPLICATION NO. : 15/265258
DATED : August 6, 2019
INVENTOR(S) : Fox et al.

Page 1 of 1

It is certified that error appears in the above-identified patent and that said Letters Patent is hereby corrected as shown below:

In the Claims

Column 28, Line 20, change "the unfixed portion of the wing" to -- "an unfixed portion of the wing" --.

Signed and Sealed this
Eighth Day of October, 2019

Andrei Iancu
*Director of the United States Patent and Trademark Office*